United States Patent
Moore

(10) Patent No.: US 11,825,989 B1
(45) Date of Patent: Nov. 28, 2023

(54) APPARATUS AND METHODS FOR STORING, TRANSPORTING, AND/OR GRINDING HERBS AND/OR SIMILAR THINGS

(71) Applicant: Ryan Moore, Los Angeles, CA (US)

(72) Inventor: Ryan Moore, Los Angeles, CA (US)

( * ) Notice: Subject to any disclaimer, the term of this patent is extended or adjusted under 35 U.S.C. 154(b) by 0 days.

(21) Appl. No.: 17/238,081

(22) Filed: Apr. 22, 2021

(51) Int. Cl.
*A47J 42/34* (2006.01)
*A47J 42/40* (2006.01)

(52) U.S. Cl.
CPC ............... *A47J 42/34* (2013.01); *A47J 42/40* (2013.01)

(58) Field of Classification Search
CPC .. A47J 42/32; A47J 42/34; A47J 42/38; A47J 42/40
See application file for complete search history.

(56) References Cited

U.S. PATENT DOCUMENTS

| | | | | |
|---|---|---|---|---|
| 3,587,982 | A * | 6/1971 | Campbell | B65D 83/0038 222/129 |
| 5,472,421 | A * | 12/1995 | Klearman | A61M 5/3129 604/82 |
| 8,695,906 | B2 | 4/2014 | Hainbach | |
| 2012/0006922 | A1* | 1/2012 | Wilson | A47J 42/08 241/293 |

OTHER PUBLICATIONS https://helpingpot.com/weed-grinder-buyers-guide/, "How to Find the Best Grinder", May 13, 2019.
https://herb.co/guides/the-best-grinders-on-the-market/, "A Complete Guide to All the Best Weed Grinders to Buy in 2021", May 28, 2020.
https://geaseeds.com/blog/en/best-types-of-grinders/, "Best Types of Weed Grinders", Mar. 25, 2021.
https://combieengineering.com/ks-classic, "Combie KS Classic", Mar. 25, 2021.

* cited by examiner

*Primary Examiner* — Matthew Katcoff
*Assistant Examiner* — Mohammed S. Alawadi
(74) *Attorney, Agent, or Firm* — J. Mark Holland & Associate; Mark Holland; Alison Adnan

(57) ABSTRACT

Apparatus and methods are disclosed for storing, transporting, grinding, and/or dispensing/pouring herbs and/or similar materials and things. A compressing/urging plate/platform is disclosed, which can selectively move the herbs or other materials toward a grinding assembly, and the ground material can be captured on the other side of the grinding assembly, for subsequent dispense and/or use. The inventions can reduce and simplify the steps and the overall apparatus needed to accomplish transportation, storage, consumption, and/or use of herb-like materials and things.

14 Claims, 20 Drawing Sheets

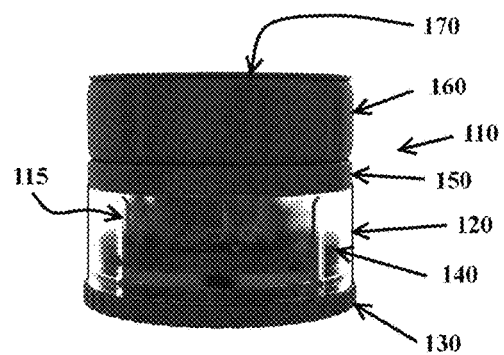
Fig. 1G
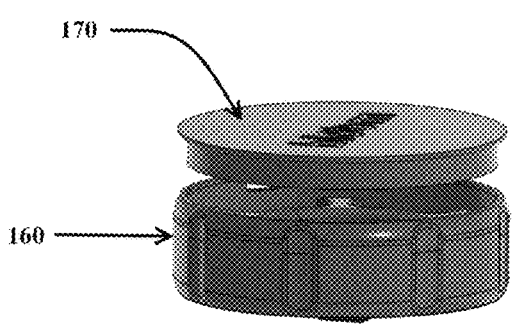
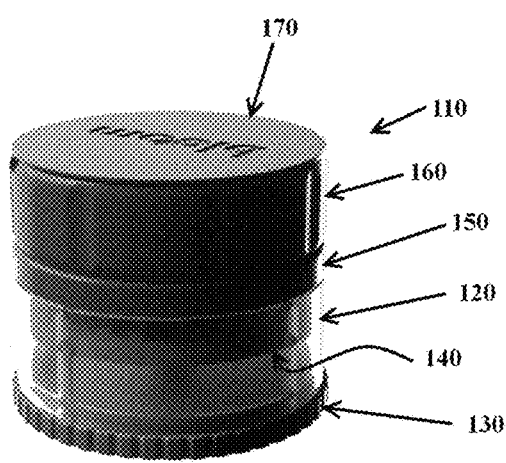
Fig. 1H
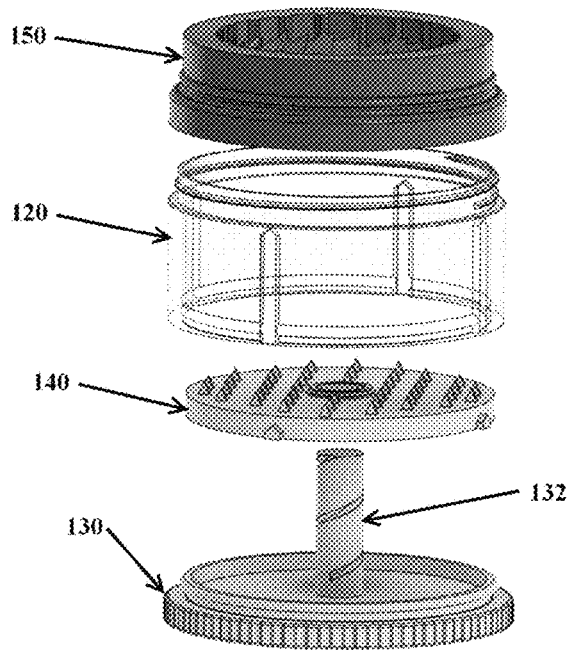
Fig. 1I

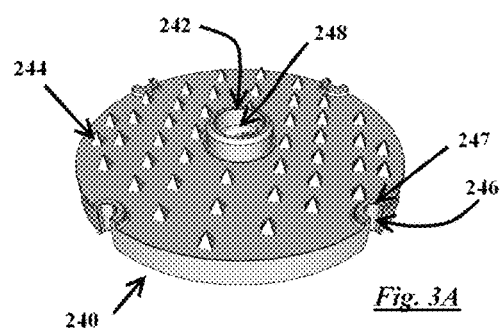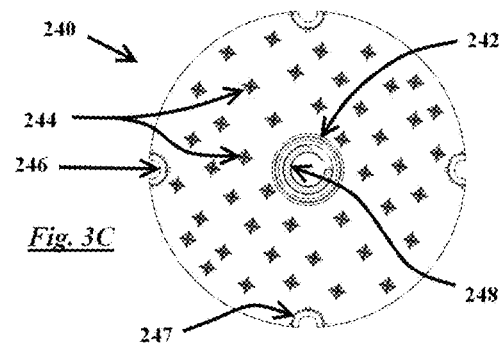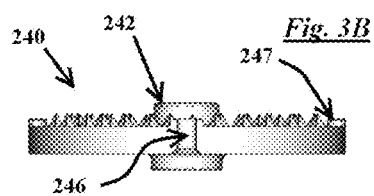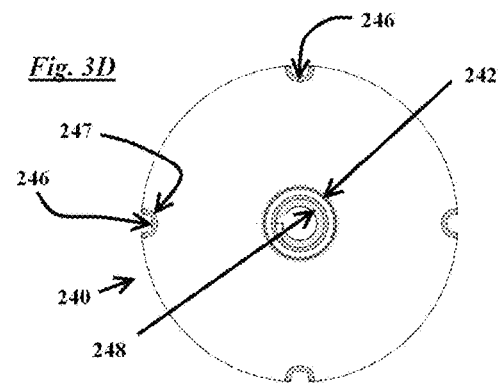

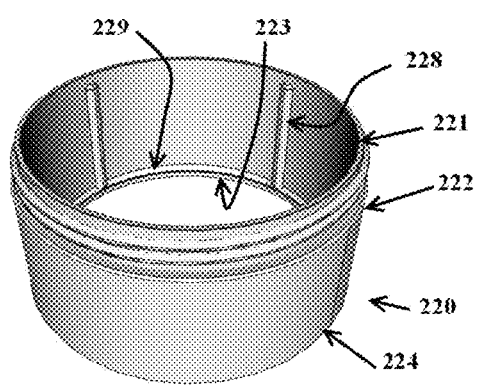
*Fig. 4A*
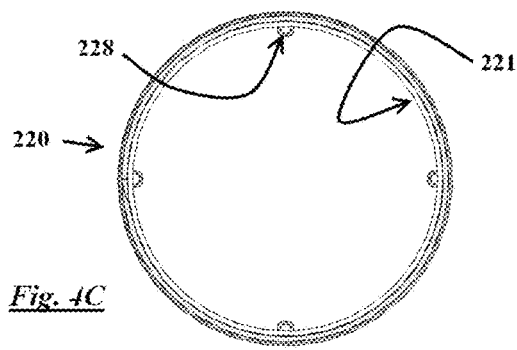
*Fig. 4C*
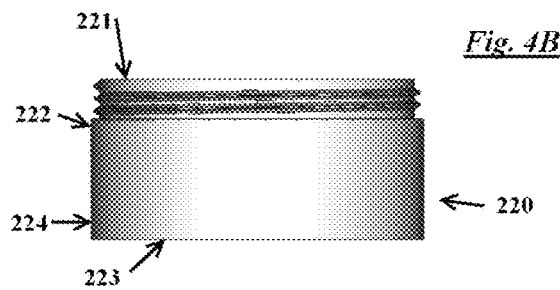
*Fig. 4B*
*Fig. 4D*
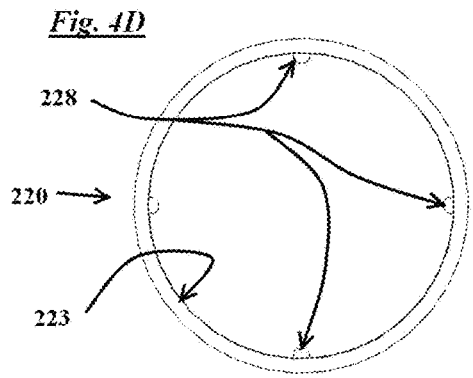

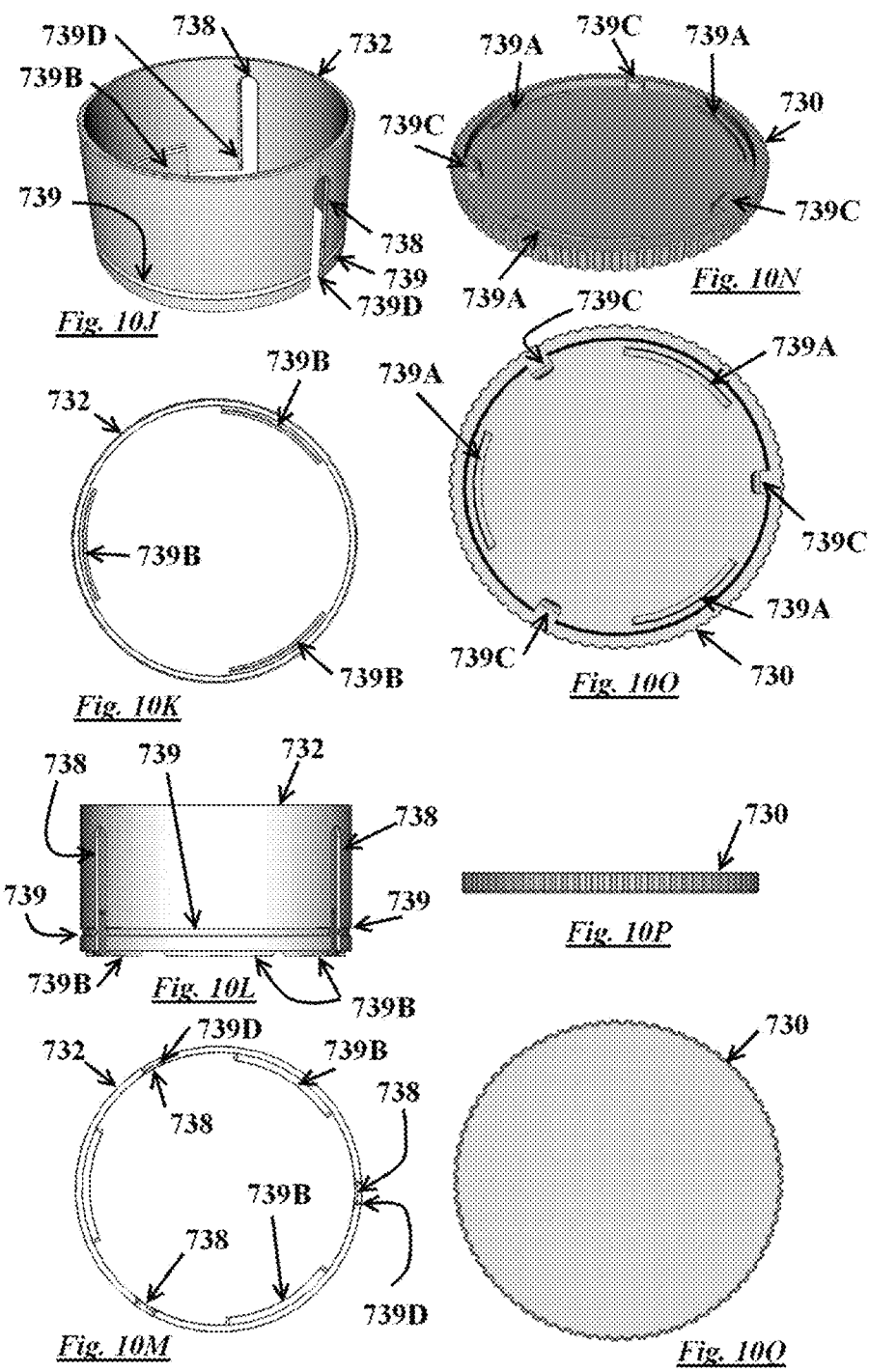

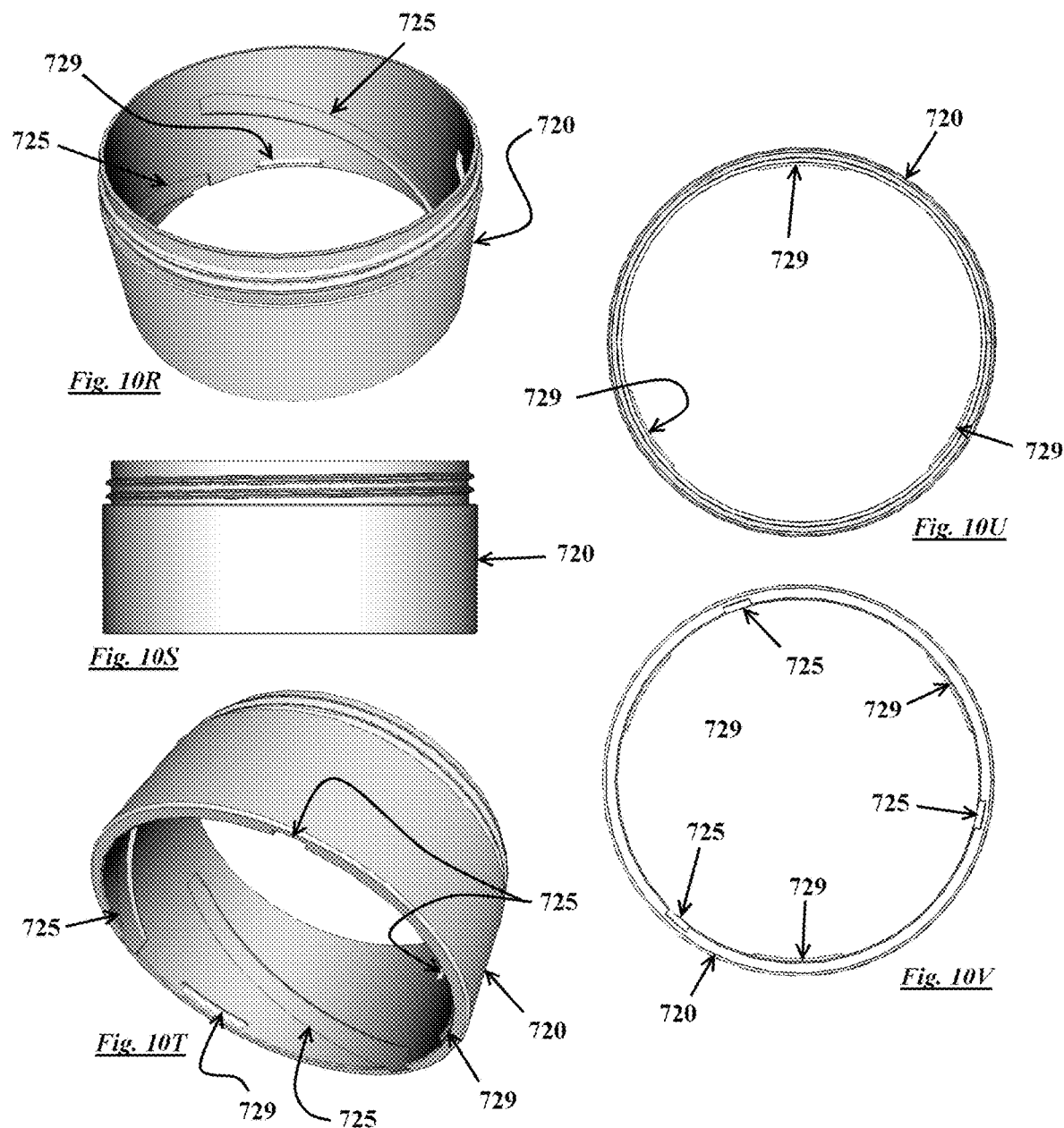

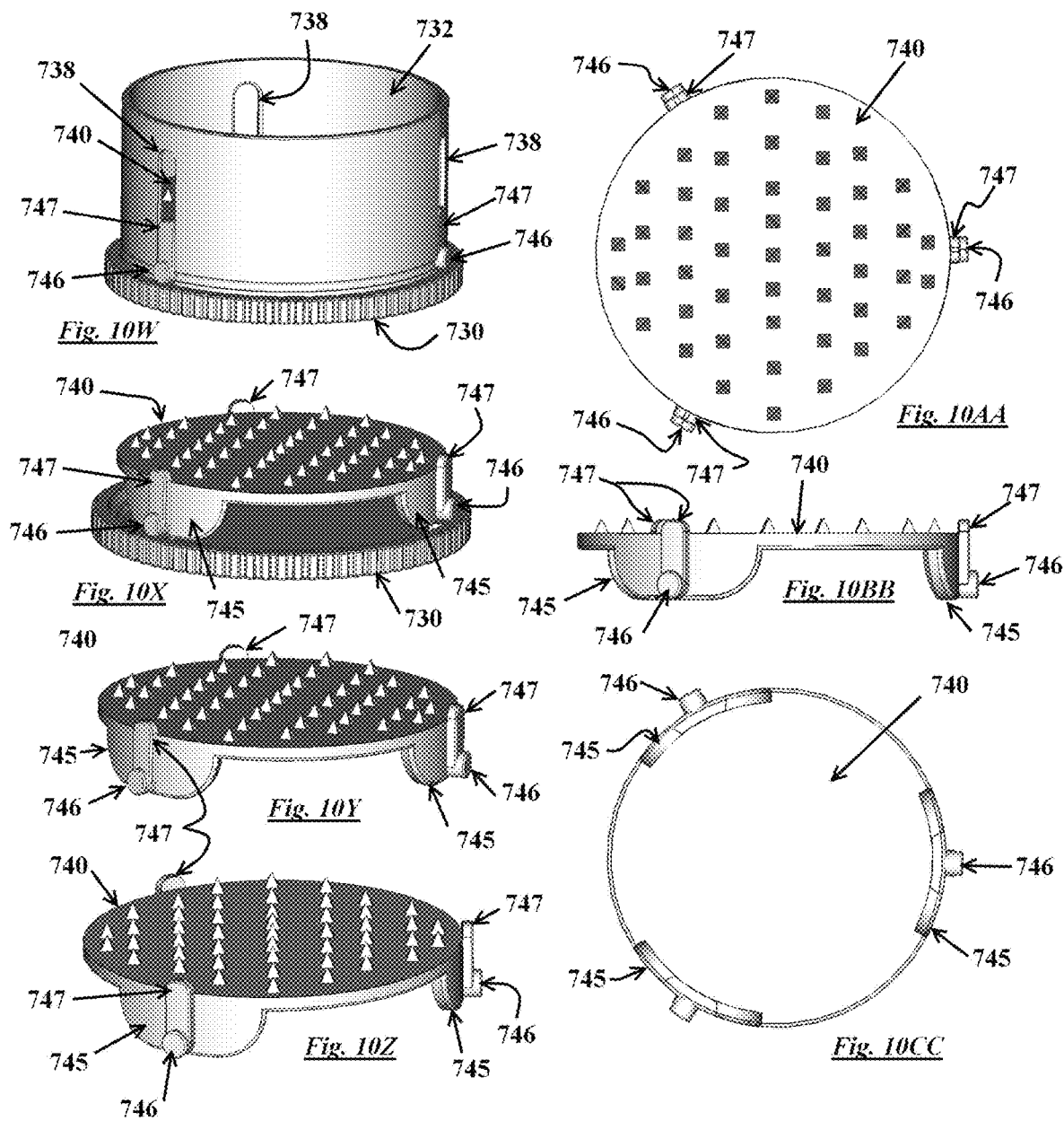

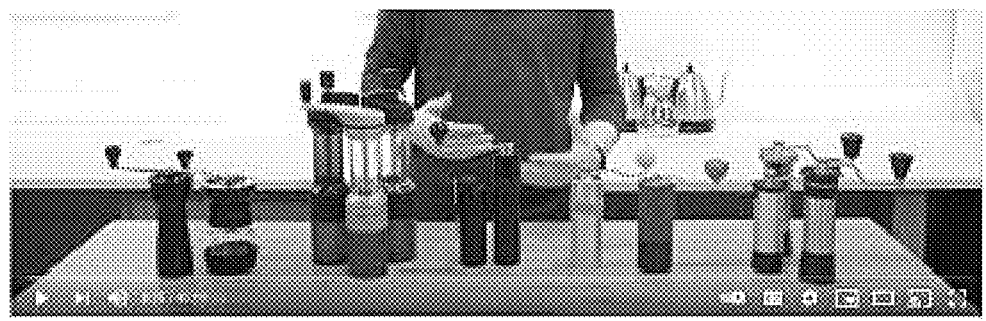
*Fig. 12A* - *Prior Art*
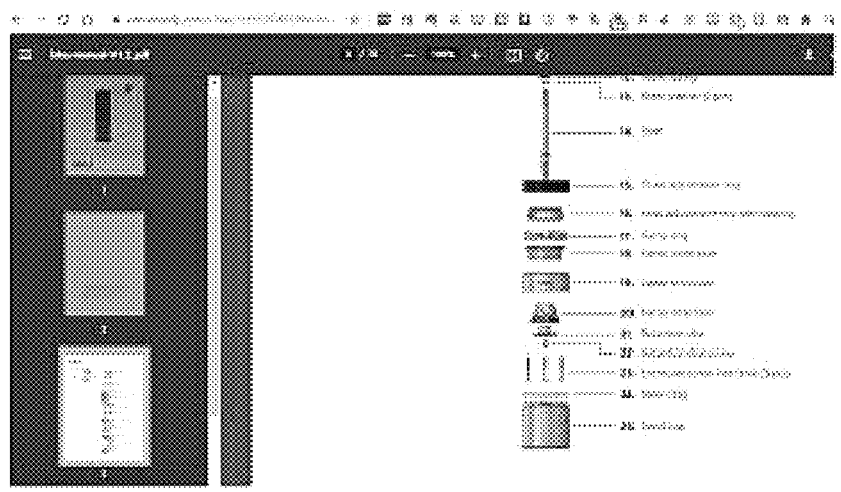
*Fig. 12B* - *Prior Art*

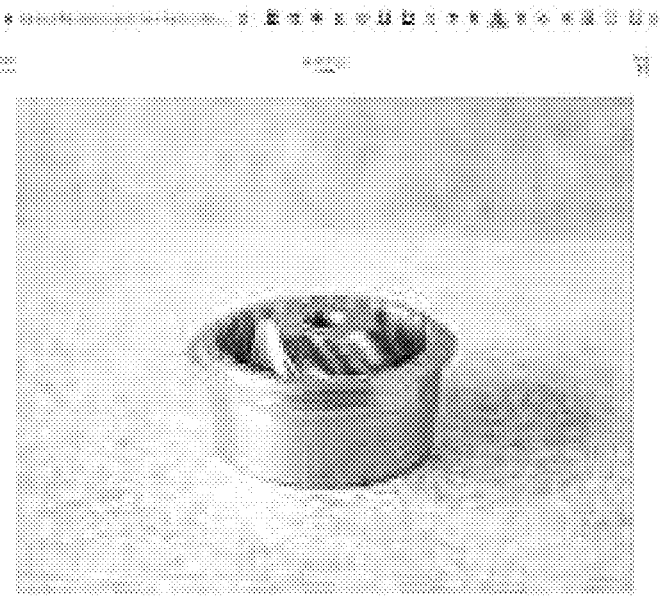
Fig. 12C - Prior Art
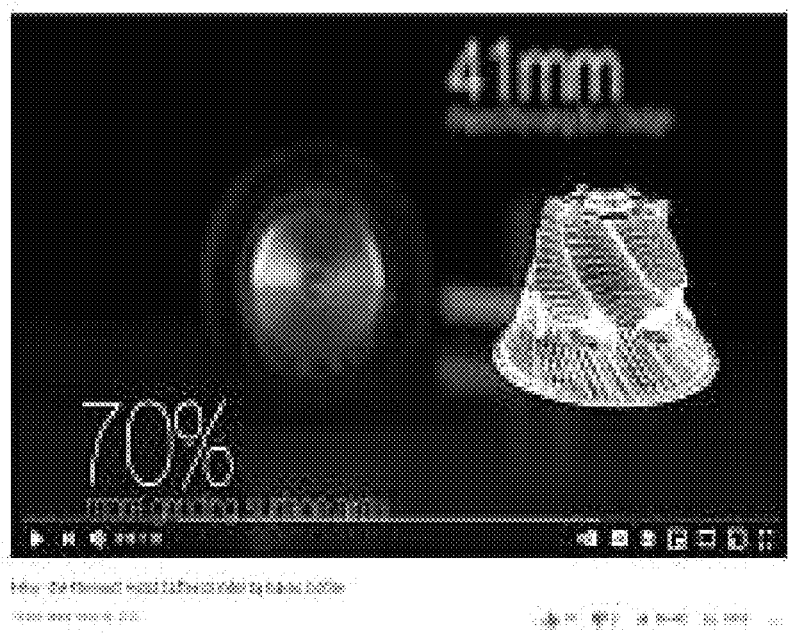
Fig. 12D - Prior Art

APPARATUS AND METHODS FOR STORING, TRANSPORTING, AND/OR GRINDING HERBS AND/OR SIMILAR THINGS

FIELD OF THE INVENTION

The present inventions are directed to apparatus and methods for storing, transporting, grinding, and/or further storing/transporting (after grinding) herbs and/or similar materials and things. The inventions can be especially beneficial for applications involving herb-like consumable materials that commonly require or use some combination of those steps (storing, transporting, and/or grinding). As compared to prior systems and technology, certain embodiments of the inventions can reduce and simplify the overall apparatus needed to accomplish those actions, and/or can simplify the process(es) used for transportation, storage, grinding, consumption, and/or other use of those herb-like materials and things. The inventions also can reduce the overall environmental footprint of users, and the associated efforts required of users to accomplish those processes and activities.

BACKGROUND OF THE INVENTIONS

Probably for millennia, humans have stored, transported, and/or ground seeds, herbs, and similar items. As can be confirmed on the Internet, and as most adults are aware, many systems and apparatus have been designed and used for those purposes, and continue to be used today. Some of the many current examples are illustrated in FIGS. 11-12.

Seed-style grinders include pepper and salt mills and coffee grinders, including such high-end devices as Hiku's Kanso model (see FIGS. 12A-D, for example). Typically, these grinding devices are useful for relatively dense and granular materials (such as coffee beans, salt crystals, peppercorns, etc.), and gravity can be readily used to feed the unground granular materials into a grinding element. Thus, these devices typically have a "store" of the material in a refillable compartment that is positioned "over" the grinding element, and users simply maintain that orientation during the grinding action (manually-powered or otherwise) and gravity feeds the granular material into the grinding element.

Although the present inventions can be used for such "dense and granular" materials (that can feed into the grinding element/s via gravity), at least certain embodiments of the present inventions also can be used to grind "less dense and/or more leafy" materials (ones that do not tend to feed so reliably via gravity). Although other devices have been developed for such materials, those devices do not provide some or all of the benefits of the present inventions.

An example of a prior art device directed to grinding this type of "more leafy and less dense" material is disclosed in Hainbach U.S. Pat. No. 8,695,906 (the '906 patent). Because of that subject matter, Hainbach '906 includes some background information that also is relevant to the current inventions. For example, the '906 patent describes prior art hand-held manual spice grinders used for seed-like items (such as peppercorns), and asserts that such prior art grinders cannot be used in applications wherein herbs (for example, materials "consisting of leaves and relatively long strands"; col. 1, l. 29-30) must be both stored and ground. The Hainbach '906 patent itself purports to disclose a "device which can both store the herb, as well as serve as a grinding device so as to cut and grind the herb to the desired level, while minimizing the odors emanating from the device" (col. 1, l. 53-55).

To accomplish those purported goals, Hainbach discloses a three-piece apparatus—a cup 14, a cap 12, and a storage receptacle 16 (with the storage receptacle 16 nested within the cup 14 and the cap 12). The storage receptacle 16 must be capable of being placed within the cup 14 and rotated with respect to the cup 14 (col 3, l. 28-30). The cup and the storage receptacle each have a set of spaced grinding teeth (labeled as grinding elements 26 and 44). The sets of teeth 26 and 44 extend toward each other, and interfit and overlap with each other.

To accomplish the desired grinding, Hainbach '906 discloses that the herb initially is located in the storage receptacle 16, and must be transferred from the storage receptacle 16 into the cup 14. Following that transfer, the storage receptacle 16 is then placed back into the cup 14. In that configuration, the teeth 26 and 44 extend into the herbs to be ground, and due to the overlap of the two sets of teeth, the user can rotate the cup and storage receptacle with respect to one another, causing the teeth to grind or tear the herbs (col. 2, l. 1-14). After grinding, the storage receptacle 16 must again be removed from the cup 14, so that the ground herb can be poured from the cup and used or otherwise consumed. Following that pouring/dispense, the storage receptacle 16 must again be reassembled into the cup 14.

The Hainbach '906 patent device is described as having a purportedly "airtight and watertight" seal "between" those three elements (cup 14, cap 12, and storage receptacle 16). The seal is disclosed as "tight contact" between (a) the shoulder 34 on the outside of the storage receptacle 16, and (b) the upper rim 36 of the cup 14 (col. 4, l. 45-59). In addition, the "seal" is provided by a ring 62 on cap 12 that frictionally engages a tapered inner diameter of the upper portion 64 of the storage receptacle 16 (col. 4, l. 60 through col. 5, l. 24).

As indicated above, using the Hainbach '906 patent's device is somewhat complicated and requires a significant number of steps. According to the '906 patent itself (at col. 5, l. 10-42), and assuming that a user previously has placed herb/s within the storage receptacle 16, the user must:

a. disengage and remove the cap 12;
b. remove the storage receptacle 16 from the cup 14 (by lifting the receptacle 16 "upwardly and outwardly" from the cup 14);
c. remove the desired amount of herbs 24 from the receptacle 16;
d. place those herbs 24 in the cup 14;
e. reinsert the receptacle 16 into the cup 14 (see FIG. 5 of the '906 patent);
f. grasp the gripping surface 28 on the receptacle 16;
g. rotate the receptacle 16 with respect to the cup 14 while applying downward pressure (to grind the herbs 24 between the grinding teeth 26 and 44 (see FIG. 6 of the '906 patent);
h. lift the receptacle 16 outwardly from the cup 14;
i. pour the ground herb from the cup 14 in a controlled manner (such as into a pipe or onto smoking paper, etc.);
j. again place the receptacle 16 into the cup 14; and
k. attach the cap 12 to the cup 14.

The present inventions provide benefits over the Hainbach '906 patent's device and disclosures, as well as over all other prior art of which the inventor is aware.

SUMMARY OF THE INVENTIONS

As disclosed herein (and as otherwise will be understood by persons of ordinary skill in the art), the present inventions provide many advantages. Among other things, the present inventions provide apparatus and methods that, in various embodiments, can simplify and provide an improved flexibility for storing, transporting, and/or grinding herbs and similar materials (and even seed-like materials, as mentioned above). In certain embodiments, a user can do one or more of the following:

a. store and/or transport a desired type and amount of an herb (limited only by the dimensions of a storage element/chamber);
b. urge a selected amount of that herb toward a grinding element (without disassembling the apparatus);
c. grind a desired amount of the ground herb (again, without disassembling the apparatus, to the limits of the dimensions of a second storage element/chamber);
d. store the ground herb/s for subsequent transportation, use, and/or dispense (such as by opening a cap or other closure/access on the second storage element/chamber); and/or
e. dispense the ground herb/s immediately from the grinding element/s to a location outside of the apparatus.

In certain embodiments, the present inventions allow a wide range of substances (such as seeds, salt, tobacco, herbs, etc.) to be stored and ground on demand, in a selectable amount from a given supply held within the container. In preferred embodiments, the inventions permit users to easily and gradually press or force the substance against a grinding tool in a controlled manner and at a controlled rate. The inventions also can eliminate the need for a gravity feed of the material/s into the grinding region, and selectively can capture the ground portion for subsequent dispense and/or use, or alternatively allow the ground material to by dispensed as it exits the grinding element or is otherwise ground.

The grinding function and apparatus can be any of a wide range, including without limitation not just those shown in the attached drawings but also grinding elements shown in a wide range of prior art devices (as will be understood by persons of ordinary skill in the art). In certain embodiments, the inventions include a selectively movable platform within a first storage container. Independently of any grinding action, the user preferably can selectively move the platform within the first storage container, to exert a desired amount of pressure and/or urge movement of the material toward a grinding region/apparatus of the embodiment. For grinding, preferably the user positions the apparatus so that the first storage container is above the grinding section/element. Although gravity is not needed to urge the material into the grinding element/s, this orientation helps ensure that the ground material (as it exits the grinder) "falls" through the grinding section/element after grinding, and away from the first storage container. Regardless of the orientation of the apparatus, the user preferably can grind a desired amount of the material, which preferably is "caught" in a second storage container portion of the apparatus (that receives the ground material from the grinding element/s), for subsequent dispense and/or use. In certain embodiments, the second "storage container" can be opened during grinding or can be omitted entirely, and the ground material dispensed contemporaneously with the grinding action (a la a conventional pepper mill). In other embodiments, the second storage container can hold the ground material until such time as the user "opens" it to access/dispense the ground material.

To replenish the material in the container (with new material to be stored/transported/ground), the urging platform can be selectively moved away from the grinding region/apparatus, the first storage container opened to receive the material, the new material placed into the first storage container, and the first storage container then closed. In preferred embodiments, this opening/closing of the first storage container is provided by one or more grinding elements being removably engaged as a cover on the first storage container. Thus, except when the first storage container has been completely emptied of unground material, that first storage container can serve as a storage/transport device for that material.

Among other things, the inventions preferably provide a beneficial solution for grinding leaves and similar "stranded" substances that might not otherwise be ground in the way that may be desired (because gravity alone is not sufficient to make the substance/s contact a grinding region/apparatus). This contrasts with, for example, pepper/peppercorn grinders, which (as noted above) rely on gravity and the shape and relatively "dense" nature of peppercorns to reliably force the peppercorns into sufficient engagement with the grinding blades/tools/region to permit the desired grinding. In other words, at least for some leaves and similar "stranded" substances, gravity may not be sufficient to "pull" those "leafy" materials into grinding engagement with the grinding apparatus of such prior art devices.

In addition, in many prior art systems (such as the Hainbach '906 patent device), users have to manually transfer the material to be ground from (1) a separate storage container to (2) a grinding region. In certain embodiments of the present invention, the material can be ground without the need to transfer the material from a storage container portion of the assembly. This advantage is good for the environment (reducing the need for separate storage containers), and can save the user time and effort by eliminating the need to transfer the material prior to each grinding action.

In certain embodiments of the present invention, the selective positioning of the movable/urging platform within a container can be accomplished by one or more cooperating threads, grooves, and/or detents. The threads/grooves/detents can be located at any of a wide range of positions on the apparatus, including for example on one or more of (a) the moveable platform, (b) the interior of the container, (c) a central cylinder/post, and/or (d) an inner sleeve within the first storage container. In certain embodiments, the actuation of the platform can be accomplished via connection to a rotatable "dial" type controller, similar to the way that some solid stick deodorants can be dispensed via a dial, or some lipsticks are moved in and out of a tube using a dial. Among the many alternative embodiments of the inventions, a wide range of other apparatus and methods can be used to selectively position the moveable platform. One or more spring elements can be positioned within the assembly to push the moveable platform with a desired force, toward the grinding region/apparatus.

The precise dimensions and materials used to fabricate the apparatus in any given embodiments of the invention can be selected from a wide range and variety, depending on the particular application. For example, features such as adjustable "fineness" of the ground material can be included in various embodiments, and the volume/capacity of the main storage container and the "post-grinding" collection area similarly can be adjusted based on the needs of any particular application. Persons of ordinary skill in the art will understand that the shape, materials, and dimensions preferably will be sufficiently strong and lightweight to provide the desired storage, transportability, and grinding, and also preferably will be non-contaminating to the seeds, herbs, or other materials to be stored, transported, and/or ground. Plastic, metal, and/or other materials may be used, depending on the embodiment/s. Likewise, the methods of fabrication can be any of a wide variety, including machining metal, injection molding, and many other processes.

The present inventions are described herein with reference to the accompanying Figures, which serve as illustrations of some of the many embodiments in which the inventions may be practiced. Subject to the context and other factors (including for example the understanding of persons of ordinary skill in the arts relevant to the inventions), in those Figures similar reference numerals generally refer to similar or identical elements throughout this description. By way of examples (and not an exhaustive list), persons of ordinary skill in the art will understand that the following columns of elements are at least generally similar to each other in some way or ways (e.g., all the elements in the right-most column, each ending in "70," are at least generally similar to each other in some way or ways):

| FIGS | Elements | | | | | |
|---|---|---|---|---|---|---|
| 1A through 1F | 20 | 30 | 40 | 50 | 60 | 70 |
| 1G through 1I | 120 | 130 | 140 | 150 | 160 | 170 |
| 3A through 3D | | | 240 | | | |
| 4A through 4D | 220 | | | | | |
| 5A through 5D | | | | 250 | | |
| 6A through 6E | | | | | 260 | |
| 7A through 7E | | | | | | 270 |
| 8A through 8F | | | | | | 370 |
| 8G | | | | | | 470 |
| 8H | | | | | | 570 |
| 9A through 9F | 620 | 630 | 640 | 650 | 660 | 670 |
| 10A through 10E | 720 | 730 | 740 | | | |

Those Figures and references, and the other terminology used in these descriptions, are not intended to be interpreted in any limited or restrictive manner, simply because they may be utilized in conjunction with a detailed description of one or more embodiments of the inventions. Furthermore, various embodiments of the invention (whether or not specifically described herein) may include one or more of the features disclosed herein, no single one of which (a) is necessarily solely responsible for any particular desirable attribute(s) of the inventions or (b) is essential to practicing the inventions described.

Other features and advantages of the present inventions will become apparent from the following more detailed description, taken in conjunction with the accompanying drawings, which illustrate, by way of examples, various principles of the inventions.

BRIEF DESCRIPTION OF THE DRAWINGS

FIG. 1A is a perspective view; FIG. 1B is a side view; FIG. 1C is a bottom view; FIG. 1D is a top view; FIG. 1E is a sectional side view; and FIG. 1F is similar to FIGS. 1A and 1E, but provides a perspective view of the section.

FIGS. 1G-I illustrate one of the many alternative embodiments of the present inventions. FIG. 1G is a side perspective view of an assembled grinder apparatus. FIG. 1H is similar to FIG. 1G, but is slightly enlarged and is a perspective view of the device of FIG. 1G from a slightly higher angle, and with the compressing/urging platform 140 raised/extended slightly further upwardly (closer to the cap 170 than in the configuration shown in FIG. 1G). FIG. 1I is an exploded view of the device of FIGS. 1G and 1H.

FIGS. 3A-D are, respectively, perspective, side, top, and bottom views of the compressing/urging plate/platform of FIGS. 1A-1F.

FIGS. 4A-D are, respectively, perspective, side, top, and bottom views of the lower main body/bottle/first container of FIGS. 1A-1F.

FIG. 7E is taken along the line 7E-7E in FIG. 7B. As discussed and disclosed herein, in certain embodiments of the inventions, the second storage body (that receives the ground material from the grinding element/s) can be formed/located within and/or as part of the cap element, alternatively or in addition to being partially and/or fully formed in the grinder actuator/second storage body of FIGS. 6F-L.

FIGS. 8A-F are, respectively, upper perspective, lower perspective, rotated upper perspective, bottom, top, and side views of this alternative cap embodiment.

FIGS. 9A-E are, respectively, upper perspective, top, bottom, side, and section views of this alternative embodiment. FIG. 9F is similar to FIG. 9E, but is slightly enlarged and its section is slightly rotated (as compared to FIG. 9E) and it provides a lower perspective view of that slightly rotated section.

FIGS. 10A-E are, respectively, upper perspective, top, bottom, section perspective, and side views of an alternative embodiment.

FIGS. 10J-M are, respectively, perspective, top, side, and bottom views of an inner sleeve as shown in FIGS. 10A-E.

FIGS. 10N-Q are, respectively, perspective, top, side, and bottom views of a dial/actuator as shown in FIGS. 10A-E.

FIGS. 10R-V are, respectively, upper perspective, side, lower perspective, top, and bottom views of an outer sleeve as shown in FIGS. 10A-E.

FIGS. 10W-X are two upper perspective views of subassemblies of the embodiment shown in FIGS. 10A-E. Specifically, FIG. 10W illustrates the embodiment shown in FIGS. 10A-E, without and/or prior to assembly with the outer sleeve of FIGS. 10R-V. Similarly, FIG. 10X illustrates the embodiment shown in FIGS. 10A-E, without and/or prior to assembly with both (a) the outer sleeve of FIGS. 10R-V and (b) the inner sleeve of FIGS. 10J-M.

FIGS. 10Y-CC are, respectively, perspective, slightly rotated perspective, top, side, and bottom views of a compressing/urging plate/platform as shown in FIGS. 10A-E.

FIG. 12A is a screenshot taken near the beginning of a YouTube video, illustrating a selection of apparently prior art coffee grinders available to consumers. The website is https://www.youtube.com/watch?v=PXU2NXT1mlg, and information on that website indicates that the video was published on Nov. 22, 2019. It appears that all of the grinders in that video apparently use gravity feed of the coffee beans down into and through the grinding burr elements, and at least some of the grinders disclose receiving the ground coffee beans in a container at the bottom of the respective device.

FIGS. 12B-D are screenshots that illustrate further details of a coffee grinder of the type shown in FIG. 12A, captured from the following websites: FIG. 12B: https://cdn.shopify.com/s/files/1/1553/0487/files/hiku-manual-V1.2.pdf?316; FIG. 12C: https://kansocoffee.com/products/hiku-hand-coffee-grinder; and FIG. 12D: https://www.youtube.com/watch?v=EnMrjkO9Fdc.

DETAILED DESCRIPTION OF EMBODIMENTS

As described herein, the inventions disclosed herein can be used in a broad range of applications and provide many benefits. Although they can be fabricated from any suitable materials and via a wide range of methods, certain embodiments can be provided in a suitably durable and lightweight form by using plastics or similar materials, and using injection molding, 3D printing, or other suitable methods of manufacture. Although many of the components discussed herein are shown and described as "an element," persons of ordinary skill in the art will understand that each such element may (in other embodiments) be formed from a plurality of pieces that each are assembled (via gluing, heat-welding, screws, or any suitable mechanism) to make the particular "element."

The dimensions of the components of the inventions and the overall assembly likewise can vary depending on the particular application for which the embodiment/s are intended. For many uses, embodiments sized to be held and manipulated by human hands are desirable.

Figure 1A:
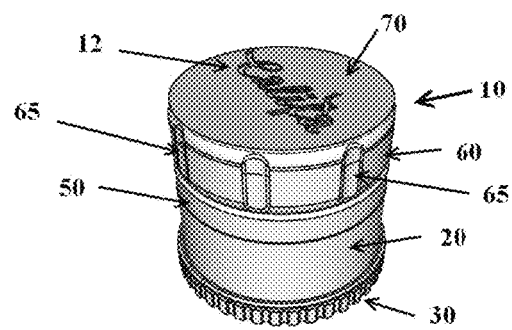
FIGS. 1A-F illustrate one embodiment of the assembled grinder apparatus of the present inventions. For that embodiment.
Figure 1D:
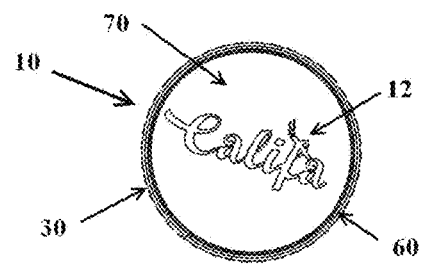
Figure 1B:
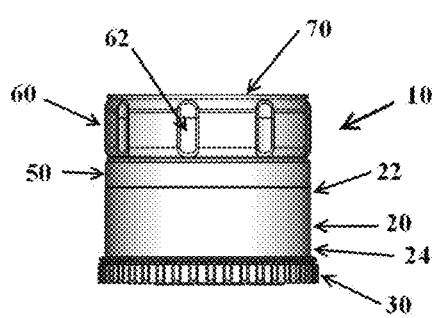

In the embodiment illustrated in FIG. 1A, the storage/transport/grinder assembly 10 (hereafter "STG assembly") may include indicia and/or aesthetic elements formed in or otherwise displayed on one or more of the components. By way of examples, a trademark 12 may be displayed on the top of the assembly 10 (see FIGS. 1A and 1D), and instructions 14 and 16 displayed on the bottom (see FIG. 1C). Persons of ordinary skill in the art will understand that the range of such markings, the colors used, and other characteristics of any such markings 12, 14, and 16 can vary widely, in order to serve a wide range of purposes. Certain embodiments may omit any such markings completely. Notices and other governmental warnings may likewise be engraved or formed or displayed on one or more parts of the STG assembly.

In the embodiment of FIGS. 1A-F, a first storage element 20 is shown as a generally cylindrical body, having a generally upper portion 22 and generally lower portion 24 (the "upper" and "lower" descriptions are applicable when those portions are viewed as shown in FIGS. 1A-F). As further explained herein, the only portions of first storage element 20 that actually need to be "cylindrical" for this embodiment shown in FIGS. 1A-F are the upper and lower portions 22 and 24, and they need to be cylindrical so that they respectively can rotatingly engage with corresponding/engaging grinding assembly 50/60 and dial element 30 (via threads and/or a snap fit or other mechanisms; see other discussion herein). Persons of ordinary skill in the art will understand that, for embodiments not requiring such engagement and relative rotation of parts about a central axis, shapes other than cylindrical may be used.

The rest of the first storage element 20 (between those upper and lower edges) is shown as cylindrical, but in other embodiments can be ridged, octagonal (or other multi-sided cross sections), etc., and still function acceptably to practice certain aspects of the present inventions. More specifically, persons of ordinary skill in the art will understand that the bulk of the first storage element 20 (between those upper/lower portions 22/24) preferably has a generally constant cross-section, in order to permit the desired movement of a compressing/urging plate/platform 40 (see FIGS. 1E and 1F) within the first storage element 20.

Persons of ordinary skill in the art also will understand that the overall height of the first storage element 20 (between the upper portion 22 and lower portion 24) and the shape and dimensions of the interior of the first storage element 20 define a space that preferably is used to contain unground seeds, herbs, and/or similar materials and/or things. One convenient size for that first storage element 20 is approximately the size of a medicine pill bottle or film canister, in which case it can be easily carried in a user's pants or shorts pocket, purse, or the like. Persons of ordinary skill in the art will understand, however, that the STG assembly 10 (including its first storage element 20) can be made in a variety of sizes, and therefore can contain/store and transport a correspondingly varied amount of the unground seeds, herbs, and/or similar materials and/or things.

Figure 1E:
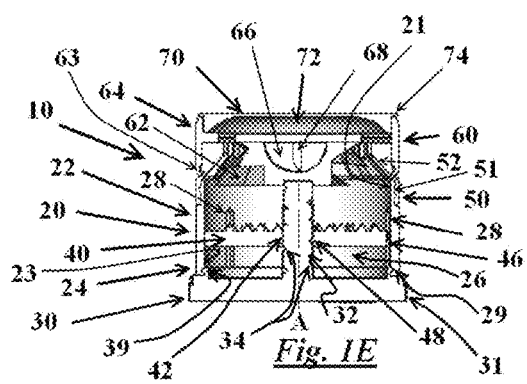
Figure 1C:
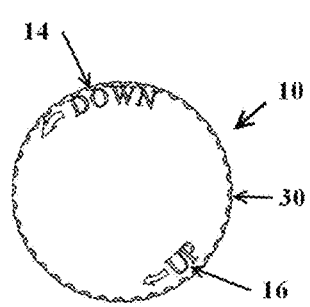
Figure 1F:
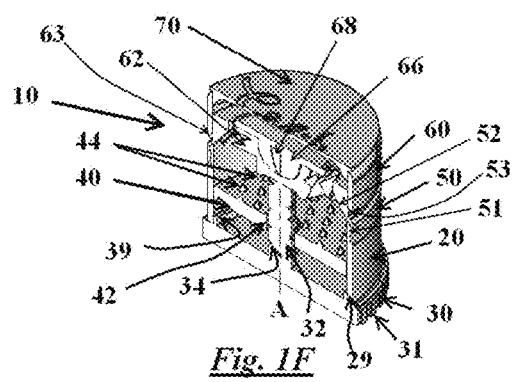

Persons of ordinary skill in the art will understand that compressing/urging plate/platform 40 preferably is a relatively flat element with an outer edge that at least generally slidingly abuts the inner surface 26 of the sidewall/s of first storage element 20. As best shown in FIG. 1F, the compressing/urging plate/platform 40 preferably includes one or more gripping teeth or similar structures 44 on its upper surface, to engage with the unground seeds, herbs, and/or similar materials and/or things during the grinding action described herein. Preferably, those structures 44 help ensure that the unground seeds, herbs, and/or similar materials and/or things do not simply roll, slip, or slide across the upper surface of the platform 40 during grinding action (as discussed herein), and instead that those materials are more likely to actually be "held" by the tooth structures 44 and therefore ground as desired by a user.

The compressing/urging plate/platform 40 also preferably includes one or more detents 46 at its periphery, generally abutting and interacting with one or more corresponding detent element/s 28 on the interior 26 of the sidewall/s of the first storage chamber 20. In embodiments such as illustrated in FIGS. 1E and 1F, the detent element/s 28 preferably are groove or channels in the sidewall, generally parallel to the central axis A, and the detent/s 46 preferably slidably moves up/down within that channel 28. Persons of ordinary skill in the art will understand that the engagement between these detents 46/28 can be via slots in the sidewall of the chamber 20 and tabs formed on the periphery of the platform 40 (as shown in FIGS. 1E and 1F), or the reverse (one or more slot/s on the peripheral edge of platform 40 and corresponding vertical "tab/s" formed on the sidewall's interior 26), a combination of those, or any other suitable apparatus for facilitating movement of the urging platform toward and/or away from the grinding element/s. A desired function of those interacting detents is that they both (a) permit the desired sliding movement of the platform 40 within the chamber 20 (toward and/or away from the grinding element/s) and (b) prevent significant relative rotation of the platform 40 with respect to the chamber 20, around a central vertical axis A of the assembly 10.

As indicated, the movement or urging of the platform 40 (along and/or in the direction of the axis A, toward and/or away from the grinding element/s) can be accomplished in any suitable way. Alternative to the embodiment illustrated in FIGS. 1A-F include, by way of examples and not by way of limitation, via one or more spring elements (not shown), a manually contacted push surface (moved by direct pressure from a user's fingers, as used in some antiperspirant sticks) that is accessible from the bottom of the assembly 10 (not shown), or otherwise. Persons of ordinary skill in the art will understand that, by urging the platform 40 upwardly (toward the grinding element/s), the unground seeds, herbs, and/or similar materials and/or things that may be in the storage element 20 will correspondingly be urged/forced/moved toward the grinding element/s (upwardly if the assembly 10 is oriented as shown in the depictions of FIGS. 1A-F, or "downwardly" if the assembly 10 is inverted from the depictions of FIGS. 1A-F).

As mentioned above, in the embodiment of FIGS. 1A-F, the dial element 30 preferably is rotatably mounted/engaged on the bottom of the first storage element 20, via a snap fit ring 39 and detent engagement groove 29 acting between those two parts. As illustrated in in the embodiment of FIGS. 1A-F, the ring 39 is formed on the dial element 30 and the corresponding groove 29 is formed in the interior of the first storage element 20, but persons of ordinary skill in the art will understand that the parts could be reversed in alternative embodiments. Similarly, persons of ordinary skill in the art will understand that, although the ring 39 is illustrated as extending completely around the periphery of the dial element 30, in alternative embodiments it instead might be interrupted or "broken" into less than a complete encircling ring, and even into two or more separate detents extending slidably into the corresponding groove 29 (similar to the rotating detent engagement described and illustrated in FIGS. 10R-V below).

Preferably, a user can readily grip and rotate the dial element 30 with respect to the first storage element 20, by gripping the exterior of the storage element 20 with one hand and the external periphery of the dial 30 with the other hand. Persons of ordinary skill in the art will understand that, to better facilitate this gripping and rotation, knurled or other gripping elements 31 preferably can be provided on the exterior of one or both elements 20 and 30. Preferably, rotating the dial 30 around the central axis A with respect to storage element 20 slides ring 39 within the detent 29, without disconnecting the engagement between the ring 39 and detent 29.

Rotating elements 20 and 30 with respect to each other preferably also rotates a central cylindrical post element 32 that preferably is connected to and/or part of dial 30. Persons of ordinary skill in the art will understand that the post 32 can be fabricated integrally with the dial element 30, or can be formed separately and affixed to the dial element 30 in any suitable manner (via glue, screw, welding, etc.). As with the other elements within the present inventions, the specific size and shape of the post 32 can vary according to the application in which the inventions are being used, but the post 32 preferably is sufficiently strong to repeatably move or actuate the platform 40 in an up/down direction, as described herein, and also is sufficiently small enough to not take excessive space within the first storage element 20 (because that storage space needs to also accommodate the unground seeds, herbs, and/or similar materials and/or things, prior to grinding).

In addition, and as illustrated in some of the alternative embodiments shown and/or described herein, persons of ordinary skill in the art will understand that a wide variety of other apparatus and methods can be used to practice the inventions, including to accomplish many of the functions described herein. Among others, those functions include "urging" the material toward one or more grinding elements. Alternative embodiments to ones in which there is a central post 32 include, without limitation, one or more springs urging the material toward the grinding element/s, structure/s at the periphery of a platform (rather than at its center; see for example the embodiments of FIGS. 10A-CC below), etc.

In the embodiment of FIGS. 1A-F, the compressing/urging plate/platform 40 preferably also has a central opening 42 that generally corresponds to cylindrical post 32. Opening 42 preferably is sized and positioned to generally abut the exterior periphery of cylindrical post 32, and to be slidable along that post 32 in the direction of the vertical/lateral axis A. The opening 42 preferably includes an internal thread portion 48 that engages a mating thread 34 formed along some or all of the post 32. In the embodiment of FIGS. 1A-F, those threads 48 and 34 preferably interact when the rotation of the dial element 30 correspondingly rotates that post 32 with respect to the storage element 20. Because the detents 46/28 prevent rotation of the platform 40 (around the axis A) with respect to the storage element 20, the rotating thread 34 is rotating with respect to the thread 48, and the interaction of those threads converts the rotation of the post 32 into a desired up/down movement of the platform 40. Thus, by rotating the dial 30, the user can control the lateral position of the platform 40 along the axis A, with respect to the grinding element/s of the apparatus. In other words, in the embodiment of FIGS. 1A-F, a user can move the compressing/urging plate/platform 40 (see FIGS. 1E and 1F) relatively "up" or "down" within the first storage element 20 by gripping the outside of the first storage element 20, and rotating the dial element 30 with respect to that element 20.

As mentioned above, certain embodiments of the inventions also preferably include indicia in that regard (such as "up/down" instructions and arrows 14 and 16 (FIG. 1C)) to assist a user desiring to operate the assembly 10 and "move" the platform 40 up and/or down. For embodiments in which some or all of the first storage element 20 is sufficiently transparent or translucent (see, for example, FIGS. 1G-1I), a user alternatively and/or in addition can visually observe and/or confirm the movement and/or position of the compressing/urging plate/platform 40 with respect to the grinding element/s, by simply looking through the transparent sidewall (including its interior surface 26).

On a related point, persons of ordinary skill in the art will understand that, in addition to some or all of the first storage element 20 being transparent/translucent to some degree, some or all of the other components of the inventions can likewise be "clear" (transparent/translucent to some degree).

Also in the embodiment of FIGS. 1A-F, the first storage element 20 preferably has a first opening 21 covered by a grinding assembly 50/60. Persons of ordinary skill in the art will understand that, to facilitate grinding by rotating action, a burr set 52/62 can be provided as in a conventional grinding mill, with one burr 52 on or associated with one element 50 and a mating grinding burr 62 on or associated with a second element 60. Persons of ordinary skill in the art will understand that the material to be ground preferably passes between those burrs 52/62 during rotation (of those burrs, with respect to each other) by the user. In that regard, the elements 50/60 of the embodiment of FIGS. 1A-F can be rotated with respect to each other to grind the herbs and/or similar materials and/or things that may be urged toward the assembly 50/60 by the urging platform 40. Persons of ordinary skill in the art also will understand that the present inventions can be practiced with any suitable grinding apparatus and methods, including without limitation electrical/battery/motor driven assemblies, burr elements such as shown in FIGS. 12B-D, and others.

Preferably, the grinding assembly 50/60 is attached to the first storage element 20 to cover opening 21 in a manner that will normally not permit the assembly 50/60 to rotate with respect to element 20 during the aforementioned grinding action (in which elements 50/60 preferably are rotated with respect to each other). This removable attachment between assembly 50/60 and storage element 20 can be accomplished in any suitable manner, including by relatively tight threads 51 that provide a substantial friction and thereby help prevent inadvertent dislodgement. Persons of ordinary skill in the art will understand that removal of the grinding assembly 50/60 from the storage element 20 enables a user to refill the storage element 20 with herbs and/or similar materials and/or things the user wants to grind. In addition to removal of the grinding assembly 50/60 from the opening 21 of the storage element 20, this refilling process can include steps such as placing those materials (to be ground) into the interior of the storage element 20, and reattaching the grinding assembly 50/60 over the opening 21 of the storage element 20. Persons of ordinary skill in the art also will understand that the preferred removability of grinding assembly 50/60 from the opening 21 of the storage element 20 can provide other advantages and functions, such as facilitating cleaning and/or maintaining various parts of the assembly 10.

The grinding assembly 50/60 preferably is configured to receive and grind herbs and/or similar materials and/or things from the first storage element 20 and thereafter allow the ground herbs and/or similar materials and/or things to pass through the grinding assembly 50/60 and its burrs 52/62 (or other grinding apparatus) towards a cap 70. Persons of ordinary skill in the art will understand that, in certain embodiments of the inventions, the ground materials can be received and/or stored within a second storage element or portion such as a hollow portion 72 formed in cap 70 (and/or a portion of burr/grinding actuator 60, which may be taller proportionally than shown in FIGS. 1A-F, to extend and enlarge the capacity of that second storage element). In other words, among the many alternative embodiments of the inventions, the second storage area can be provided and/or enlarged by extending the grinder actuator higher (in a direction further up from the burr elements 52/62, in the embodiments of FIGS. 1A-1F). Access to any such second storage element can likewise be provided in a wide range of suitable manners, including without limitation (and as an alternative to a cap 70) through an opening in the sidewall of any such extended height grinding actuator 64.

In the embodiment of FIGS. 1A-1F, the burr element 62 preferably is formed separately from a mounting portion/grinder actuator 64, and the two are connected to each other from opposite sides of outer burr ring/element 50. Persons of ordinary skill in the art will understand that, in alternative embodiments, the inner burr element 62 can be integrally formed with the mounting portion 64, so long as the burr element 62 is sized and shaped so that it can be positioned to properly interact in a grinding manner with a correspondingly sized and shaped mating outer burr 52.

The connection between the two elements 50 and 60 preferably permits the desired rotating movement of the two elements with respect to each other, so that the burrs 52/62 correspondingly rotate with respect to each other and grind the material that passes toward and between those burrs 52/62. In the embodiment of FIGS. 1A-1F, this preferably is accomplished by a snap-fit ring/detent construction 53/63, permitting rotatable engagement between the elements 50/60 (rotating around central axis A). After engaging those elements 50/60 (the latter temporarily consisting of the mounting portion 64) with each other, the inner burr 62 preferably is attached to the mounting portion 64 by any suitable method (glue, snap-fit, sonic welding, etc.), thereby completing the grinding assembly 50/60. Persons of ordinary skill in the art will understand that, when so assemble, the inner and outer burrs 62 and 52 preferably can be rotated with respect to each other, by rotating actuator 64 with respect to burr ring 50.

Persons of ordinary skill in the art will understand that, to reduce the risk of slippage between the mounting portion 64 and the burr 62 (when those are formed separately as in the embodiment of FIGS. 1A-1F), corresponding mating engagement fittings can be formed on each of elements 64 and 62. In FIG. 1E, this is illustrated as a flange 66 with a rounded downward shape that is oriented across the drawing of FIG. 1E, and an integrally formed matching flange 68 that protrudes in/out of the drawing of FIG. 1E. Those two flanges 66/68 together form a cross shape that fits into a corresponding cross opening formed in the center of burr 62. As mentioned above, those cross shapes can be attached to each other in any suitable manner, including a snap-fit, gluing, etc.

As mentioned above, the embodiment of FIGS. 1A-1F also preferably includes a second storage element 72 that is configured and positioned to receive the herbs and/or similar materials and/or things from the grinding assembly 50/60 after grinding. Persons of ordinary skill in the art will understand that the size, shape, and position of the second storage element 72 can be any of a wide variety, and that it preferably is sized to accommodate at least an amount of ground material desired by the user at a given time or for a given application. In the embodiment of FIGS. 1A-1F, the storage element 72 is conveniently formed integrally into a cap 70 that preferably engages with portion 60/64 by a friction fit. A lip 74 preferably abuts element 64 when the cap 70 is fully engaged therewith, and that lip 74 also can provide a convenient purchase or gripping ledge by which a user can remove the cap 70 from engagement with the element 64/60, to "open" the second storage element 72 and permit removal of the ground material after grinding.

As indicated above, in the embodiment of FIGS. 1A-1F, the rotatable dial element 30 is both rotatably engaged with the first storage element 20, and engaged with the compressing/urging plate/platform 40 to cause desired movement of the platform 40 within the first storage element 20 upon rotation of the dial element with respect to said first storage element 20. In addition, the rotatable dial element 30 preferably removably covers a second opening 23 in the first storage element 20. In the embodiment of FIGS. 1A-1F, that opening is shown oriented toward the bottom of each of those Figures. For embodiments such as those of FIGS. 1A-1F (in which the selective engagement between the first storage element 20 and the rotatable dial element 30 is a snap-fit engagement), that engagement preferably permits a user not only to rotate those parts around a central axis A while they are engage, it also preferably allows a user to disengage the dial 30 from the first storage element 20 by "unsnapping" the two parts from each other. By whatever method or structure of selective disengagement, that disengagement preferably permits a user or other person to clean and maintain the lower portions of the apparatus, repair and/or replace either of those components of the apparatus 10, and/or take other desirable actions.

Persons of ordinary skill in the art will understand that various embodiments of the inventions provide methods of storing, transporting, grinding, and/or pouring or otherwise dispensing herbs and/or similar materials and things. These methods can include various combinations and/or iterations of a wide range of steps, in a variety of orders. Such steps include, by way of example:

a. providing an apparatus such as assembly 10 that has within its first storage element 20 one or more items to be ground;
b. using a compressing/urging plate/platform 40 within the first storage element 20 to urge the herbs and/or similar materials and/or things toward a grinding assembly 50/60;
c. actuating the grinding assembly 50/60 whereby the herbs and/or similar materials and/or things are ground;
d. optionally collecting the ground material/s in a second storage element such as element 72;
e. dispensing the ground herbs and/or similar materials and/or things from the assembly 10;
f. removing a dispensing cap 70 from the assembly 10, to permit access to a second storage element 72;
g. pouring the ground herbs and/or similar materials and/or things from the assembly 10 (and/or from the second storage element 72 of the assembly 10);
h. reattaching the dispensing cap 70 to the assembly 10;
i. removing the grinding assembly 50/60 from a first opening 21 of the first storage element 20;
j. placing herbs and/or similar materials and/or things into the first storage element 20 (for storage and/or subsequent grinding, etc.); and/or
k. accessing the interior of the first storage element 20, for cleaning, repair, maintenance, etc., from one or both sides of the compressing/urging plate/platform 40.

As indicated above, the grinding assembly 50/60 illustrated in FIGS. 1A-1F preferably includes an inner burr 62 and an outer burr 52 that are sized, shaped, and configured to rotate with respect to each other and to accomplish the desired grinding of the relevant herbs and/or similar materials and/or things. The outer burr 52 and/or the inner burr 62 preferably provide an opening to facilitate passage of the herbs and/or similar materials and/or things from the first storage element (to a second storage element or for direct dispense from the assembly 10), with those materials and/or things being ground by the burrs during that passage. In embodiments such as shown in FIGS. 1A-1F, the inner burr element 62 has dimensions larger than an opening in the outer burr element 52, and the inner burr 62 is positioned relatively closer to the first storage element 20 than is the outer burr 52. In such embodiments, the grinding assembly 50/60 preferably further includes a grinder actuator 64 that is larger than an opening in the inner/outer burrs 62/52. The grinder actuator 64 preferably is fixedly attached to the inner burr 62, and rotatably attached to the outer burr 52, so that a user can rotate the inner burr 62 with respect to the outer burr 52 around the central axis A, to accomplish the desired grinding. To do so, a user preferably can (a) grip in one hand the first storage container 20 and/or the periphery of outer burr 52, and (b) grip in the other hand the periphery of grinder actuator 64. To facilitate that gripping, and/or for other purposes, one or more gripping elements 65 preferably are provided on the outside of the grinder actuator 64. Persons of ordinary skill in the art will understand that such gripping elements can likewise be provided on the outside of other elements of assembly 10 (such as elements 20 and 50) with similar usefulness and/or benefits.

Persons of ordinary skill in the art will understand that the inventions provide apparatus and methods for storing, transporting, grinding, and/or pouring/dispensing herbs and/or similar materials and things. Preferably, a compressing/urging plate/platform 40 can selectively move the herbs or other materials toward a grinding assembly 50/60, and the ground material can be captured on the other side of the grinding assembly 50/60 such as in a second storage element/portion 72, for subsequent dispense and/or use. To refill the assembly with unground material/s, the compressing/urging plate/platform 40 preferably can be moved in the other direction (away from the grinding element/s), and the first container 20 "opened" and filled. In many embodiments, the inventions can reduce and simplify the steps and the overall apparatus needed to accomplish transportation, storage, grinding, consumption, and/or use of herb-like materials and things.

In the embodiment of FIGS. 1G-I, the components, assembly/disassembly, and operation and use of the STG assembly 110 remain at least substantially similar to those discussed above for FIGS. 1A-F, with the exception of a first storage element 120. In contrast to the storage element 20 in FIGS. 1A-F, storage element 120 is "shorter" in proportion to its radius, and is made from a relatively transparent material (plastic, glass, or other suitable material and/or process). Depending on the specific dimensions for such an embodiment, the storage element 120 may accommodate a greater, lesser, or equal amount of unground seeds, herbs, and/or similar materials and/or things 115 (as compared to storage element 20 in the embodiment of FIGS. 1A-F). The transparent sidewall provides a pleasant aesthetic aspect to the assembly 10, and also permits a user to visually view into the assembly 110, to confirm the position of the platform 140, the amount of material/s remaining to be ground, etc.

FIG. 1G shows the platform 140 in a relatively "lowered" position ("downward" along the central vertical axis A of post 132, away from the grinding element/s 150/160), while FIG. 1H shows the platform 140 in a more "raised/upper" position (relatively closer to the grinding element/s 150/160). As described above with respect to FIGS. 1A-F, the dial element 130 preferably is rotated or otherwise adjusted to move the platform 140 selectively toward or away from the grinding assembly 150/160. In one direction of rotation/urging, the unground seeds, herbs, and/or similar materials and/or things (such as leafy material 115, FIG. 1G) are pressed/urged/moved and/or compressed against and/or into that grinding assembly 150/160. Preferably following that adjustment of the platform 140, the user preferably inverts the apparatus 110 so that the cap 170 is "down," and then rotates or otherwise actuates the grinding assembly 150/160 (around the central axis A) to grind the material 115.

The exploded view of FIG. 1I illustrates in greater detail one of the many ways in which the various components of this embodiment may be fabricated for ready assembly and use. Some of the details of this embodiment are labeled to correspond with the relevant elements of the embodiment of FIGS. 1A-1F discussed above.

Persons of ordinary skill in the art will understand that alternative embodiments of the inventions can include additional structural and/or procedural steps to even further add and/or enhance certain aspects of the invention. For example, although many embodiments of the inventions can be relatively watertight and/or odor-tight by virtue of the various relatively tight seals/relationship between the grinding/transporting components of the inventions, the watertightness and/or odor-tightness of the assembly between uses (between grindings) can be further enhanced. Among other things, the entire assembly can be kept inside a resealable plastic bag (not shown; any suitable size and shape bag can be used, depending on the embodiment/s of the inventions), and the user can simply unseal the bag prior to use, and reseal the bag after use. Such "resealable bag" embodiments may provide other benefits as well, such as additional storage volume outside the grinder assembly, for holding additional ground/unground material/s, rolling papers, and/or other paraphernalia, etc. in a convenient location.

In at least certain embodiments of the current inventions, using the inventions can be simpler than using prior art devices. Below is a table that compares the steps required to grind and dispense herbs or other materials, between (a) the above example of the '906 patent and (b) certain embodiments of the present inventions. The present inventions can reduce those steps (and the associated time, effort, etc.) by almost by half (from 11 steps to 6 steps, in the comparative example illustrated in the table below):

| Step | The Prior Art '906 patent (at col. 5, l. 10-42) requires a user to: | Certain embodiments of the present invention use these steps: |
|---|---|---|
| 1 | disengage and remove the cap 12; | 1. Dial/adjust the compressing/urging plate/platform |
| 2 | remove the storage receptacle 16 from the cup 14 (by lifting the receptacle 16 "upwardly and outwardly" from the cup 14); | |
| 3 | remove the desired amount of herbs 24 from the receptacle 16; | |
| 4 | place those herbs 24 in the cup 14; | |
| 5 | reinsert the receptacle 16 into the cup 14 (see FIG. 5 of the '906 patent); | |
| 6 | grasp the gripping surface 28 on the receptacle 16; | 2. Grasp the grinding actuator |
| 7 | rotate the receptacle 16 with respect to the cup 14 while applying downward pressure (to grind the herbs 24 between the grinding teeth | 3. Rotate the grinding actuator |

-continued

| Step | The Prior Art '906 patent (at col. 5, l. 10-42) requires a user to: | Certain embodiments of the present invention use these steps: |
|---|---|---|
| | 26 and 44 (see FIG. 6 of the '906 patent); | |
| 8 | lift the receptacle 16 outwardly from the cup 14; | 4. Remove the dispensing cap/cover |
| 9 | pour the ground herb from the cup 14 in a controlled manner (such as into a pipe or onto smoking paper, etc.); | 5. Pour the ground herb from the assembly |
| 10 | again place the receptacle 16 into the cup 14; and | |
| 11 | attach the cap 12 to the cup 14. | 6. Attach the cap to the assembly. |

Persons of ordinary skill in the art will understand that the foregoing comparison table (of simpler use/methods/steps that can be provided by certain embodiments of the current inventions) is focused on the steps and actions that might be taken after the herbs or other materials are positioned within the relevant grinder assembly. At least certain embodiments of the current inventions can also provide benefits in the process/es prior to those compared in the table above. As an example of such "prior" benefits, depending on the dimensions of any particular embodiment of the current inventions, a user can carry the apparatus 10/110/other into a dispensary or other point of purchase (a location for buying or otherwise obtaining the herbs or other materials 115). Commonly, the store/seller may give the herbs or other materials to the user in a separate pill bottle or similar container (such as one of those shown in prior art FIGS. 11A-11C). By using the present inventions, however, the user can instead ask the store/seller to place the purchased herbs or other materials directly into the first storage area (20/120) of the apparatus 10/110. If the seller/store will do that, the apparatus 10/100 thereby helps eliminate the use and resulting waste from containers such as those in FIGS. 11A-11C.

Figure 11A:
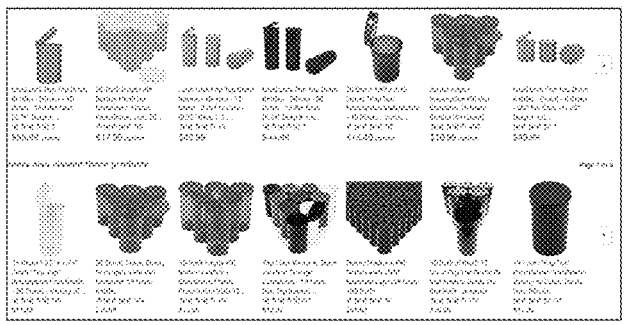
FIGS. 11A-C illustrate examples of prior art containers (for storing and/or transporting herbs and similar materials) that can be used with the present inventions.
Figure 11B:
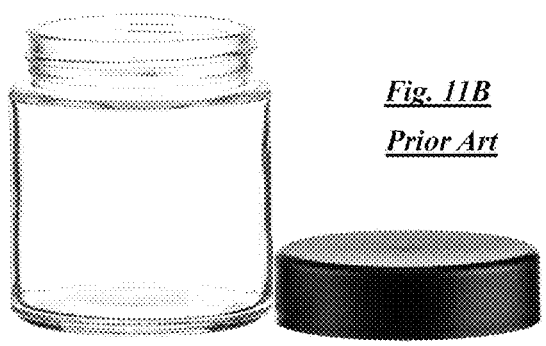
Figure 11C:

Persons of ordinary skill in the art will understand that the prior art containers in FIG. 11A are pill-bottle type containers that may be purchased in various quantities, including over the Internet (FIG. 11A is a screenshot of some of those types of products that resulted from an Internet search). Likewise, persons of ordinary skill in the art will understand that FIG. 11B illustrates a screw-top container that may be obtained and/or used in a similar manner, and FIG. 11C illustrates a transparent sealed bag containing herbs or similar materials a that a user may purchase for subsequent grinding and use.

In addition to reducing the environmental footprint of the process (by eliminating the use of superfluous containers such as those in FIGS. 11A-11C), at least certain embodiments of the current inventions can eliminate the need for the user to subsequently transfer the herbs or other materials to/from those superfluous containers (of FIGS. 11A-11C) into and/or out of the assembly 10/110. This simplifies the related efforts, time, and processes for the user to handle and/or otherwise use the material/s.

Figure 2A:
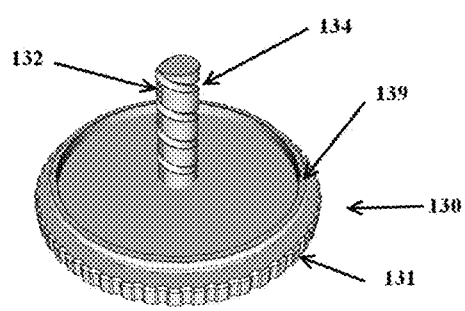
FIGS. 2A-D are, respectively, perspective, side, top, and bottom views of the compressing/urging plate/platform actuator of FIGS. 1A-1F.
Figure 2C:
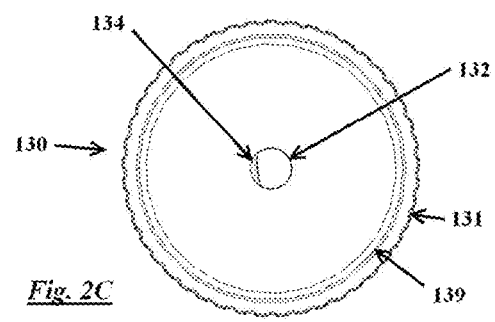
Figure 2B:
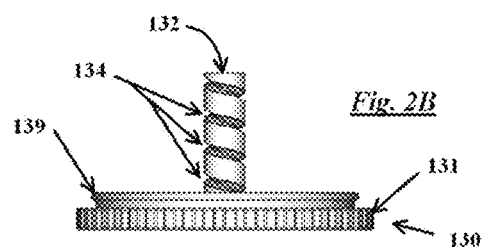
Figure 2D:
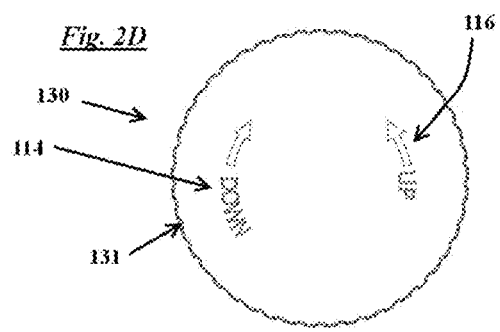
Figure 5A:
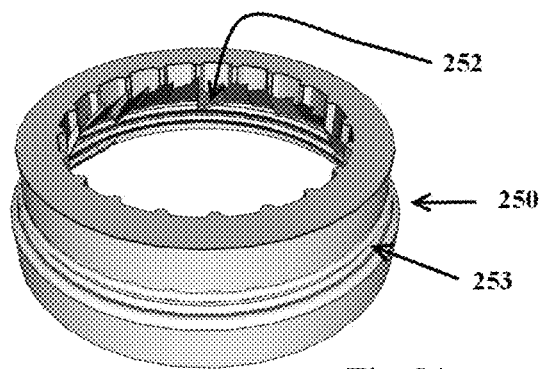
FIGS. 5A-D are, respectively, perspective, side, top, and bottom views of the intermediate collar/second grinding element of FIGS. 1A-1F.
Figure 5C:
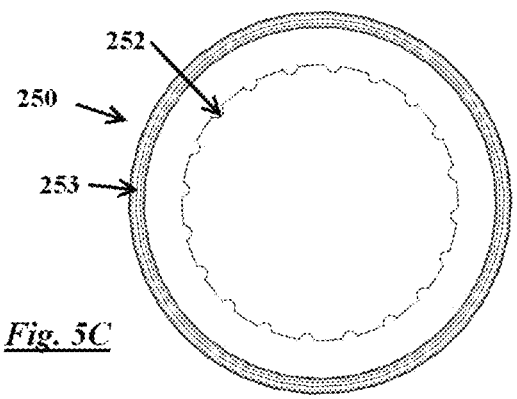
Figure 5B:
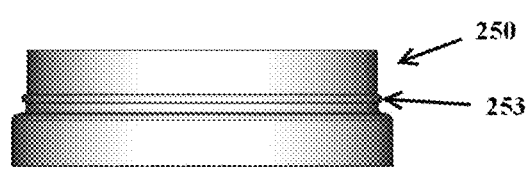
Figure 5D:
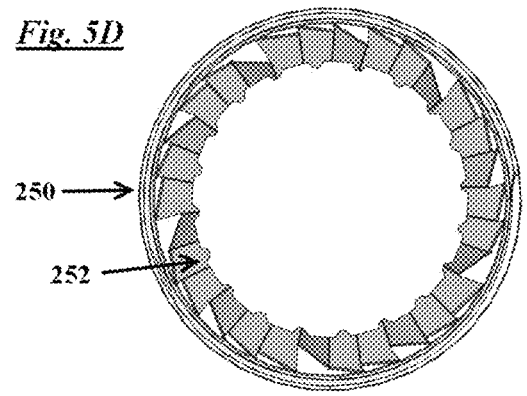
Figure 6A:
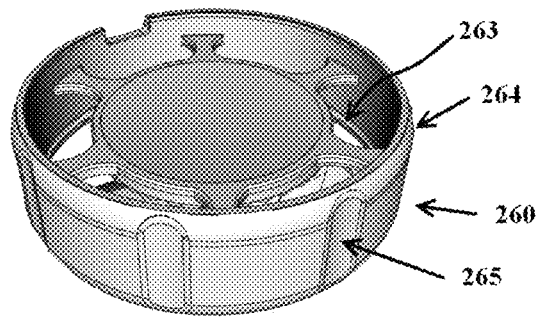
FIGS. 6A-E are, respectively, upper perspective, side, lower perspective, top, and bottom views of the assembled (a) first grinding element and (b) grinder actuator/second storage body of FIGS. 1A-1F.
Figure 6D:
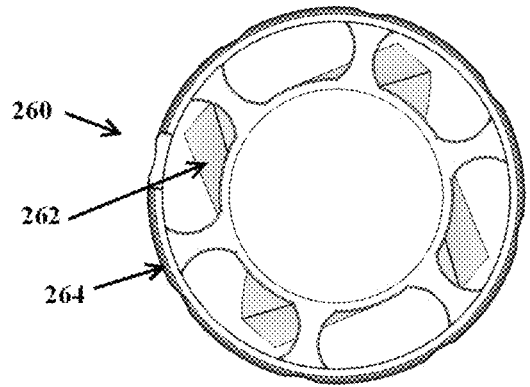
Figure 6B:
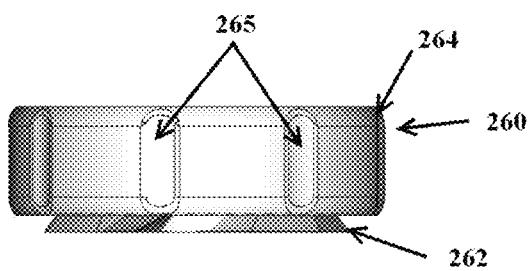
Figure 6E:
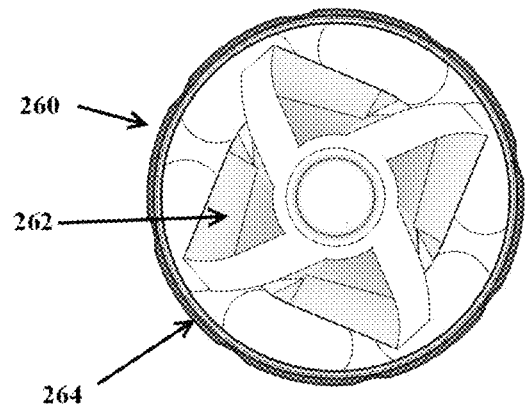
Figure 6C:
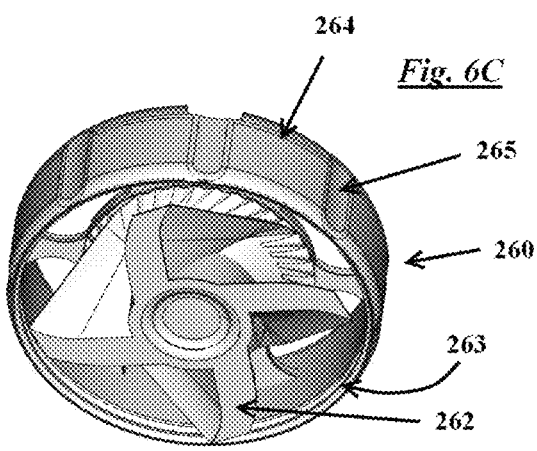
Figure 6F:
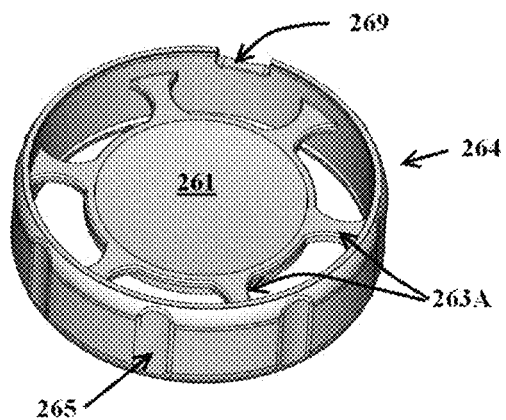
FIGS. 6F-L are, respectively, upper perspective, side, lower perspective, top, bottom, section, and perspective sectional views of the grinder actuator/second storage body of FIGS. 1A-1F.
Figure 6I:
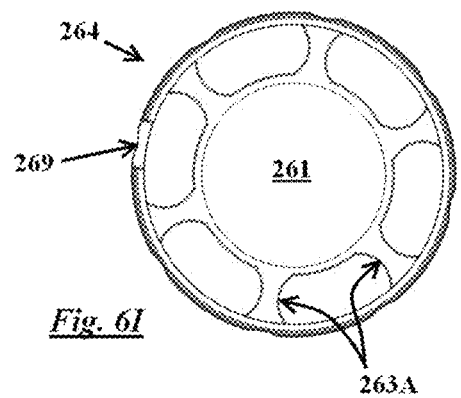
Figure 6G:
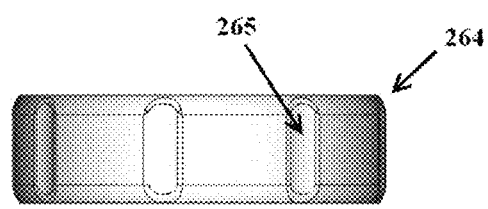
Figure 6J:
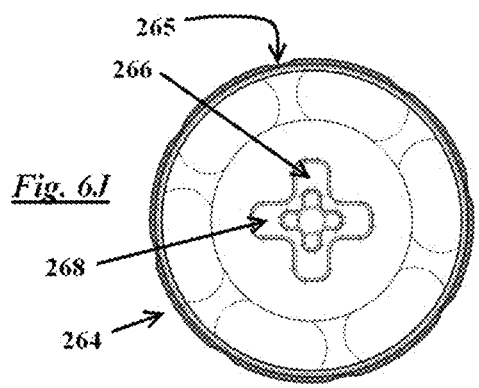
Figure 6K:
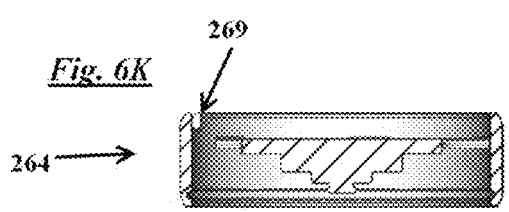
Figure 6H:
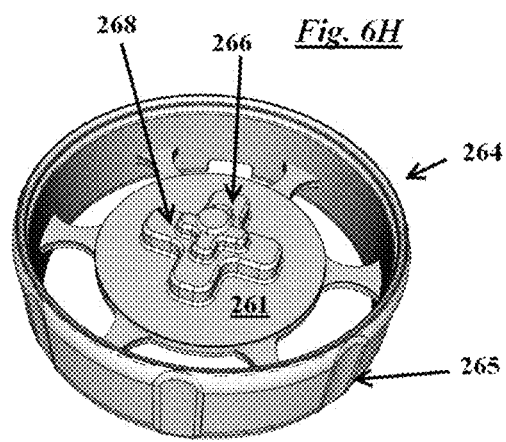
Figure 6L:
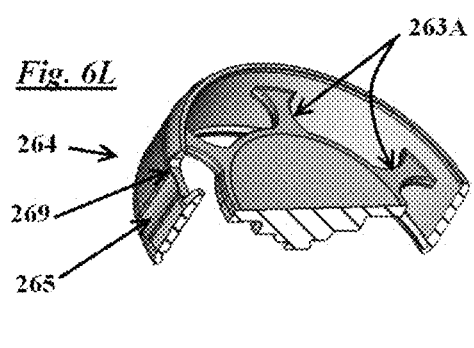
Figure 6M:
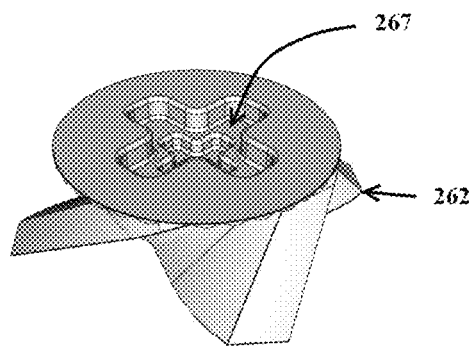
FIGS. 6M-Q are, respectively, perspective, side, bottom, top, and section views of the first grinding element of FIGS. 1A-1F.
Figure 6P:
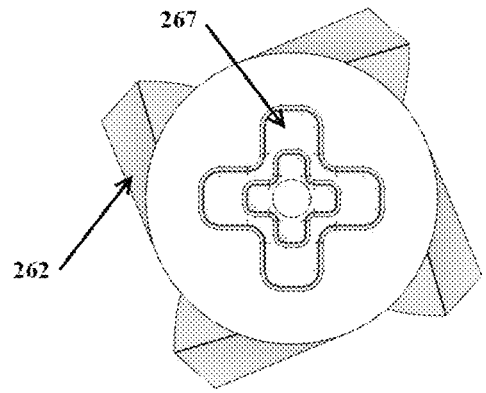
Figure 6N:
Figure 6O:
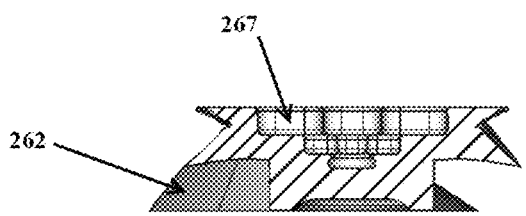
Figure 6Q:
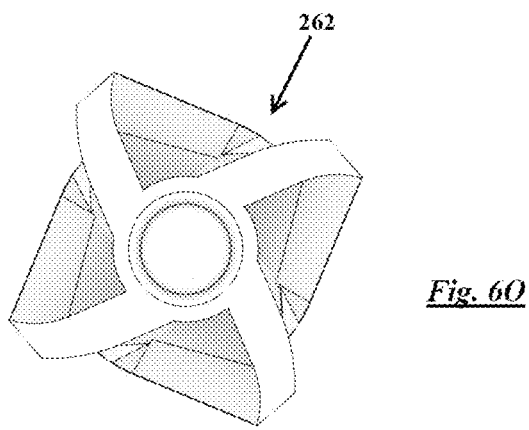
Figure 7A:
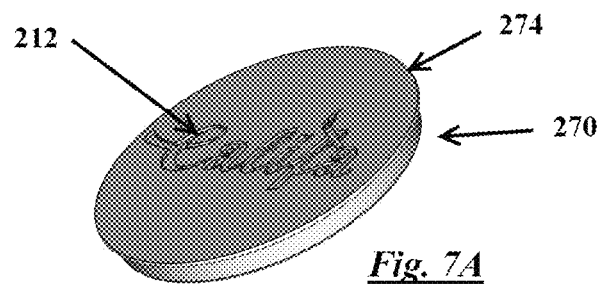
FIGS. 7A-E are, respectively, perspective, top, bottom, side, and rotated side sectional views of the cap of FIGS. 1A-1F.
Figure 7D:
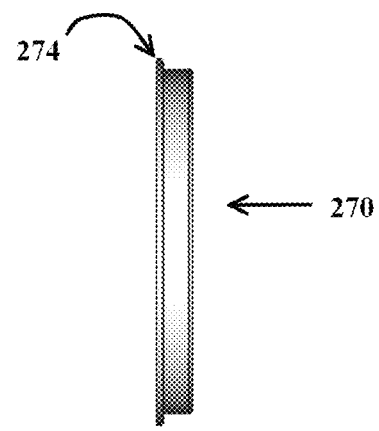
Figure 7B:
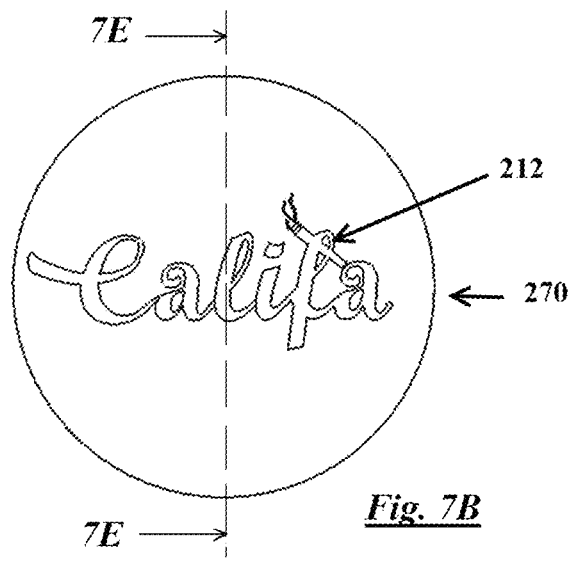
Figure 7E:
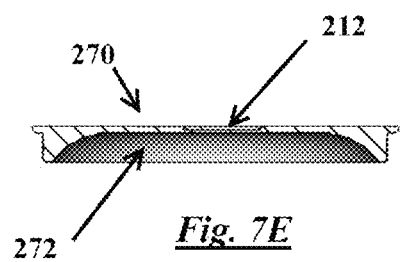
Figure 7C:
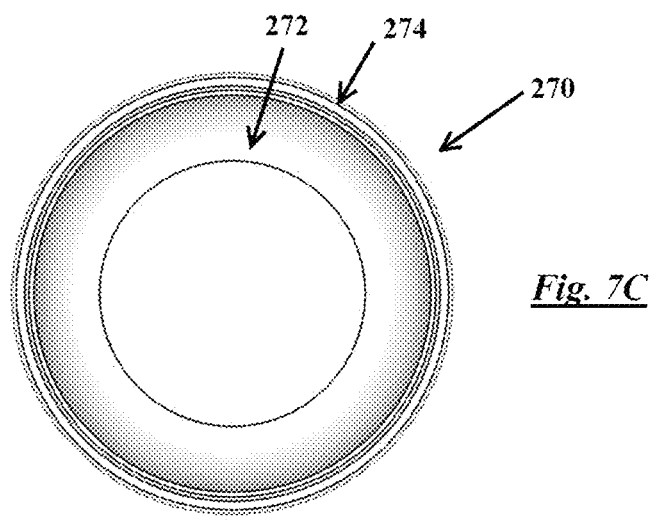

FIGS. 2A through 7E provide additional views of certain elements that can be used in certain embodiments of the present inventions, including embodiments similar or identical to those described above in FIGS. 1A-1F and FIGS. 1G-1I. Although most of those elements in FIGS. 2A through 7E are at least generally the same (in shape, function, etc.) to those of FIGS. 1A-1F and FIGS. 1G-1I, some of the differences in these additional drawings include the following:

a. FIGS. 2A-D show further details of
b. The indicia 114 and 116 in FIG. 2D is slightly different, but serves at least generally the same function, from that shown as indicia 14 and 16 in FIG. 1C;
c. In FIGS. 3A-3D, the detent 246 is reversed from detent 46 of FIGS. 1A-1F. Instead of projecting outwardly at the periphery of the element 40, one or more detents 246 are shown as a groove or channel at the periphery (generally parallel with the central axis A). The detent/s 246 are illustrated with a shoulder 247 that (among other things) can help keep the material that is to be ground from falling down the channel/groove 246 and lodging and/or accumulating "below" the platform 240 (on the side of the platform that is away from the grinding element/s);
d. In FIGS. 3A-3D, the central hole 242 has extended shoulders (along the axis A discussed elsewhere). Among other things, these shoulders can add stability to the element 240 in relation to the corresponding post along which it preferably travels, to help keep the element 240 generally perpendicular to that central axis A;
e. In FIGS. 4A-4D, one or more detents 228 extend inwardly toward the central axis A, rather then being formed as a groove or channel 28 in FIGS. 1A-1F. This allows the detents 228 to slidingly mate correspondingly with the aforementioned one or more detents 246 in FIGS. 3A-3D;
f. FIGS. 5A-7D illustrate a first/outer grinding element/burr at least similar to the element 50 in FIGS. 1A-1F;
g. In FIGS. 6F-6L, details are illustrated for an embodiment of the grinding actuator 264, including aspects by which it might be formed separately from a related inner burr (an example of which is shown in FIGS. 6M-6Q). Among many other alternative embodiments, the embodiment of FIGS. 6F-6L preferably includes a central portion 261 connected to the outer periphery of actuator 264 by a plurality of connecting legs 263A. After the material has been ground by passing through the rotating burr elements, preferably the ground material then can pass through the openings between those connecting legs 263A (and then either out of the assembly 10 and/or into a second storage element portion of assembly 10). As indicated above, a burr element (a) can be formed integrally on that central portion 261 (such as at the location of the cross-shaped post elements 266/268), (b) can be formed separately (such as illustrated in element 262 in FIGS. 6M-6Q) and then affixed to those cross-shaped post elements 266/268, or (c) otherwise can be provided in any suitable manner. Persons of ordinary skill in the art will understand that, among many alternatives, the burr 262 from FIGS. 6M-6Q can be glued or welded or snap-fit or friction-fit or otherwise attached to the cross-shaped post elements 266/268 in FIGS. 6F-6L;
h. In FIGS. 6F-6L, an undercut 269 can be provided to further facilitate ready gripping and/or removal of a cap element (not shown, but similar to cap 70, or cap 270 in FIGS. 7A-7E) from engagement with the grinding actuator 264. Persons of ordinary skill in the art will understand that a user can insert their fingernail or a thin/pointed object into that opening 269 to pry the cap from the actuator 264;
i. FIGS. 6M-6Q illustrate a burr element 262 that may be matingly attached to the grinding actuator 264 of FIGS. 6F-6L. A mating detent 267 can be formed in the burr 262, for snap-fit or other engagement with the cross-shaped post 266/268 of the grinding actuator 264. Persons of ordinary skill in the art will understand that this and other burr elements used to practice the inventions can be of a wide variety of sizes, shapes, angles, positions, number of teeth, and other features, and still function to practice at least certain of the present inventions; and
j. FIGS. 7A-7E illustrate a cap element at least similar to the cap 70 in FIGS. 1A-1F.

Figure 8A:
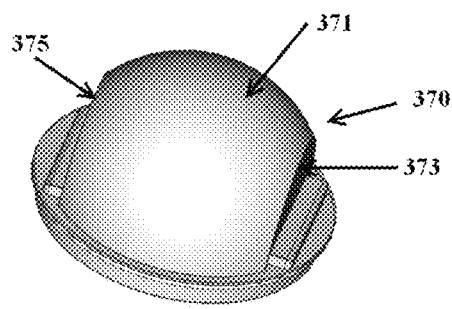
FIGS. 8A-F illustrate another of the many alternative embodiments of the cap of FIGS. 7A-D. Persons of ordinary skill in the art will understand that, among other things, this alternative cap can be used in place of the cap of FIGS. 7A-D.
Figure 8D:
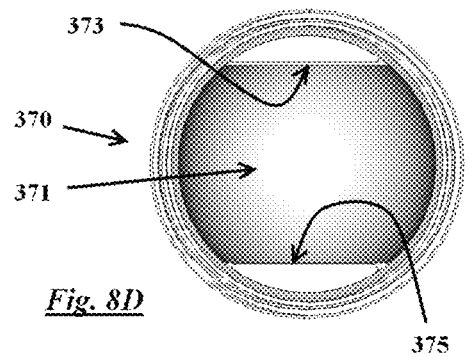
Figure 8B:
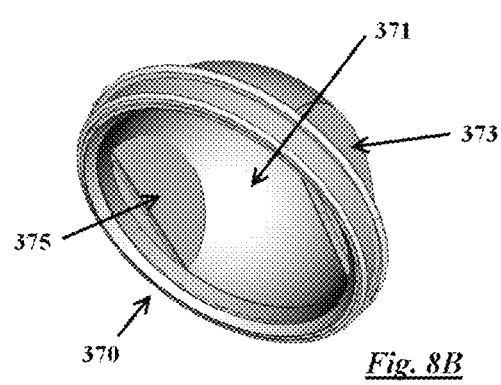
Figure 8E:
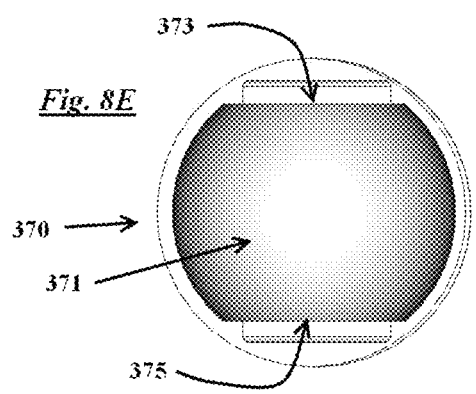
Figure 8C:
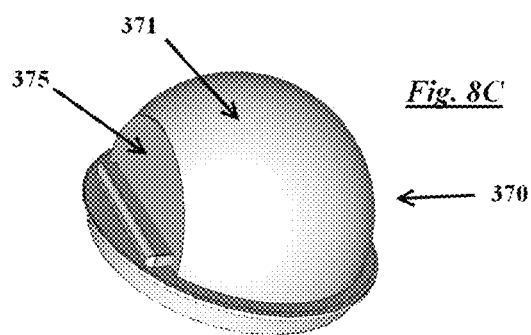
Figure 8F:
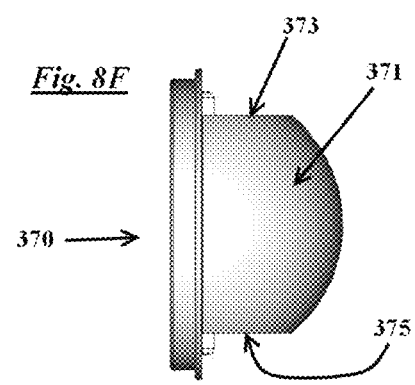
Figure 8G:
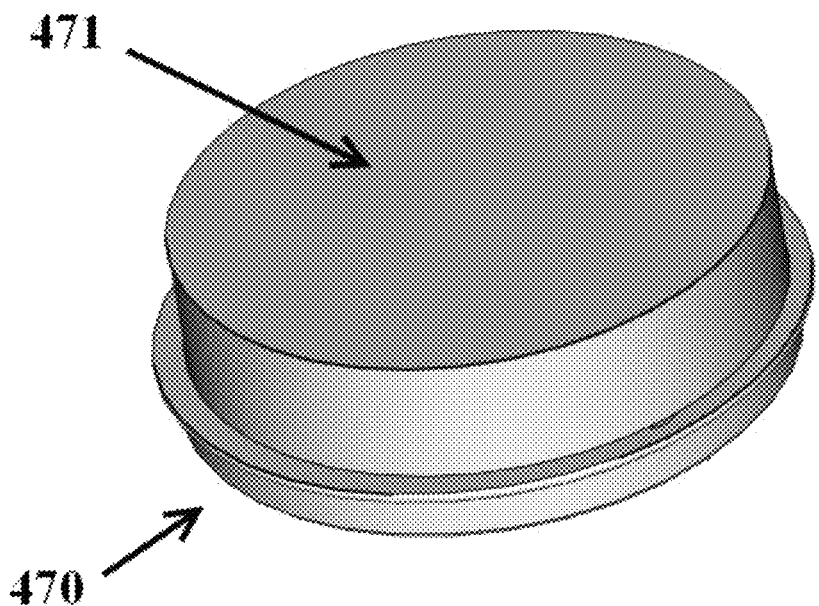
FIGS. 8G and 8H are perspective views of two more of the many alternative embodiments of the cap of the invention. As with the alternative embodiment of FIGS. 8A-F, persons of ordinary skill in the art will understand that, among other things, these alternative caps can be used in place of the cap of FIGS. 7A-D.
Figure 8H:
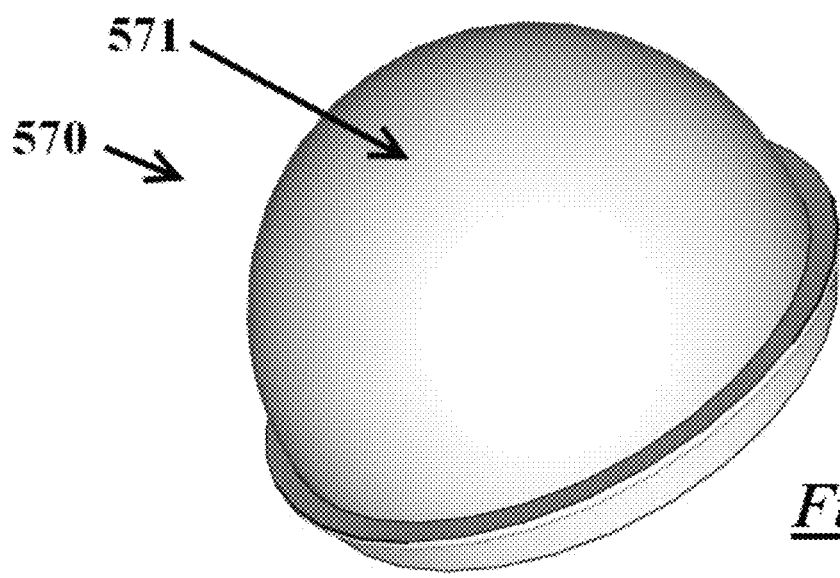
Figure 9A:
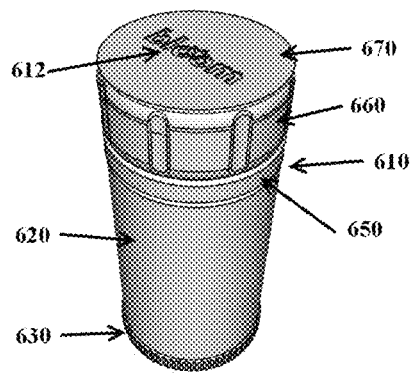
FIGS. 9A-F illustrate another of the many alternative embodiments of the inventions. Persons of ordinary skill in the art will understand that, among other things, many of the components and concepts of this embodiment are at least similar to those of the embodiment of FIGS. 1A-F.
Figure 9D:
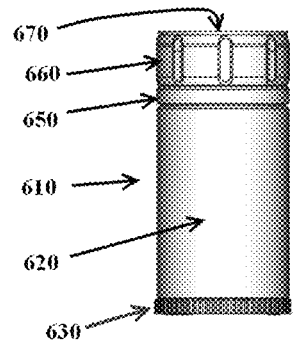
Figure 9E:
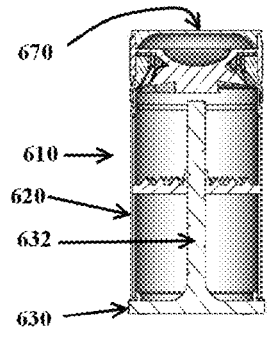
Figure 9B:
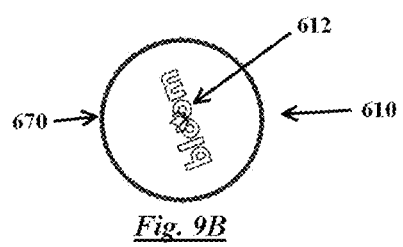
Figure 9C:
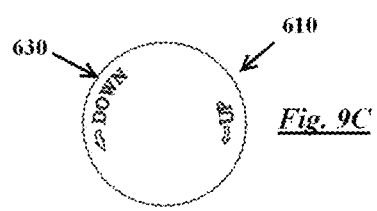
Figure 9F:
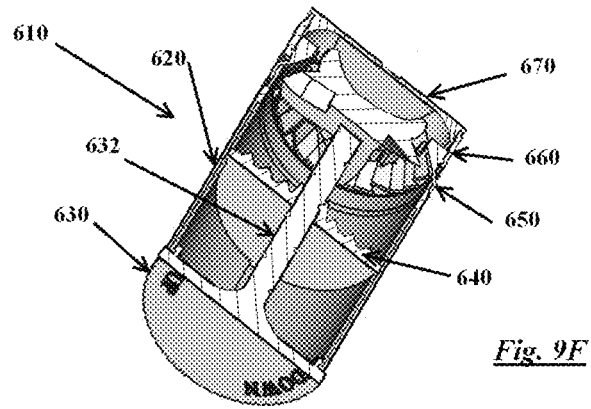
Figure 10A:
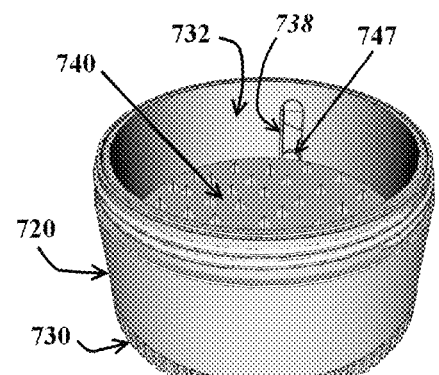
FIGS. 10A-CC illustrate some of the many other alternative embodiments of the invention, including alternative urging platforms and actuating structures to move the platform toward and/or away from a grinding element.
Figure 10E:
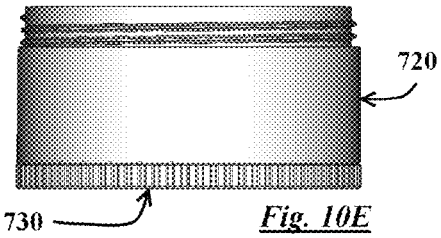
Figure 10B:
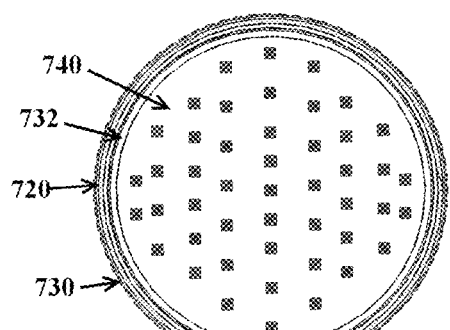
Figure 10F:
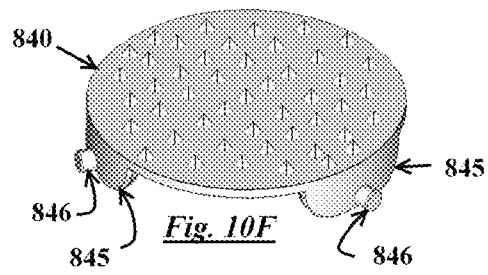
FIGS. 10F-I are, respectively, perspective, top, side, and bottom views of a compressing/urging plate/platform similar to the one shown in FIGS. 10A-E, but slightly modified as discussed herein.
Figure 10C:
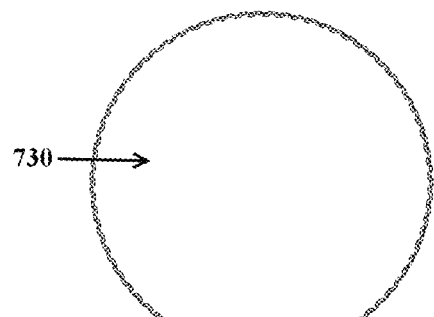
Figure 10G:
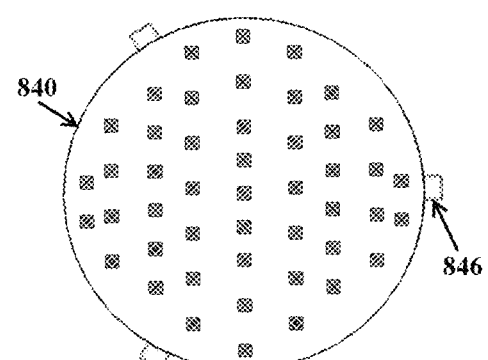
Figure 10D:
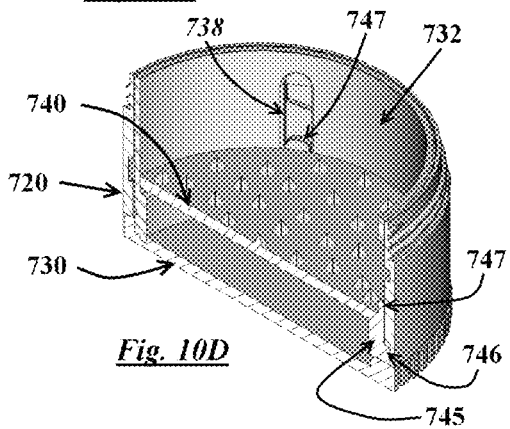
Figure 10H:
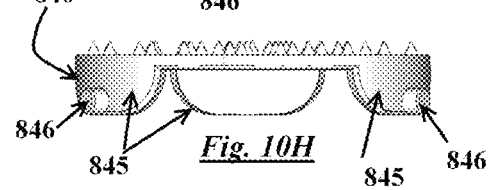
Figure 10I:
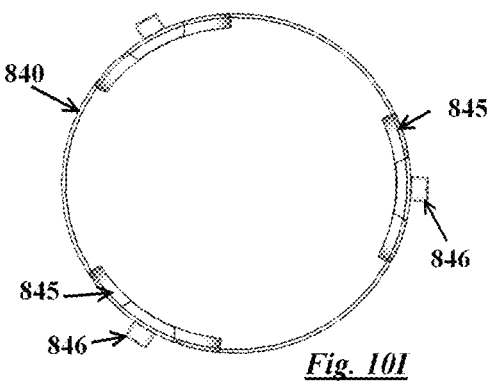

As discussed above and herein, the present inventions can be practiced in a wide range of embodiments. Some of those many embodiments are shown in FIGS. 8A-10CC. As with FIGS. 2A through 7E, these FIGS. 8A-10CC provide views of certain elements that can be used in certain embodiments of the present inventions, including embodiments similar or identical to those described above in FIGS. 1A-1F and FIGS. 1G-1I. Although most of those elements in FIGS. 8A through 10CC are at least generally the same (in shape, function, etc.) to those of FIGS. 1A-1F, 1G-1I, and 2A-7E, some of the differences in these additional drawings include the following:

a. FIGS. 8A-8H illustrate some of the many alternative embodiments of a cap 70 and storage portion 72. In FIGS. 8A-8F, a cap 370 has a semi-spherical central portion 371, with relatively flat opposing sides 373 and 375. In FIG. 8G, a cap 470 has a central cylindrical extension portion 471. In FIG. 8H, a cap 570 has a central dome shape 571. Persons of ordinary skill in the art will understand that, for each of those embodiments, the respective "central shapes" 371/471/571 are usable as additional/expanded space inside the respective caps 370/470/570. By using such an alternative cap, a user can grind and/or store more material 115 than might otherwise be grindable/storable in an embodiment such as shown in FIGS. 1A-1F;
b. In the embodiment of FIGS. 9A-9F, the first storage element 620 is taller (at least proportionally to its radius) than the element 20 in FIGS. 1A-1F, and the central post 632 correspondingly is taller as well. In addition, the trademark/indicia 612 is different from the trademark 12 in FIGS. 1A-1F. As indicated above, persons of ordinary skill in the art will understand that any of a wide variety of trademarks, slogans, and/or other decorations and/or information/markings can be placed on the assembly for aesthetic and/or informational/functional purposes;
c. FIGS. 10A-10CC illustrate embodiments in which the material/s to be ground are urged toward/away from the grinding assembly by providing peripheral linkage (similar to the linkage sometimes used in moving lipstick in and out of some lipstick tubes). In such embodiments, the urging platform 740 has no central opening and instead is solid across its middle. Instead of a central post (such as post 32 in FIGS. 1A-F) that is attached to or otherwise cooperates and rotates with the dial element/actuator 730 (when turned by a user or otherwise), these embodiments include a peripheral cylinder 732. That peripheral cylinder 732 preferably is spaced just inside the first storage container 720, in order to maximize the volume available inside the cylinder 732 in which the material/s to be ground are placed prior to grinding. The elements 720, 730, 732, and 740 preferably cooperate during user's rotation of the dial element 730 with respect to the container 720, to move the platform 740 toward or away from the grinding element/s.

d. Before discussing further details of the preferred elements of the embodiment shown in FIGS. 10A-E (including its urging platform 740), FIGS. 10F-10I illustrate another of the many alternative urging platforms that can be used to practice the inventions. In the embodiment of the urging platform 840 shown in FIGS. 10F-10I, preferably one or more detents 846 are located at the periphery of the platform 840, and can be spaced relatively away from the grinding element/s (in the preferred assembled arrangement) on corresponding tabs 845. Persons of ordinary skill in the art will understand that the provision of tabs 745/845 can provide benefits to the user. Among other things, the tabs space the platform 740/840 from the dial element 730 (to provide space for accumulation of dust or other things resulting from use of the apparatus), and can stabilize the platform 740/840 in a horizontal plane within the assembly. Persons of ordinary skill in the art also will understand the detents 846 could alternatively be positioned near or at or even above the horizontal plane of the platform 840, and that the shape and dimensions of the detents 846 and tabs 845 can be any of a wide range (including having no tabs 745/845 in certain embodiments). Preferably the detents 846 in FIGS. 10F-I are similar to detents 746 in FIGS. 10A-E in the aspect of engaging the other elements 732 and 720 when assembled, so that the rotation of dial 730 with respect to the housing 720 moves the platform 840 (740 in FIGS. 10A-E) toward/away from the grinding element/s.

e. One of the differences between the urging platform 840 of FIGS. 10F-I and platform 740 in FIGS. 10A-E is the provision of one or more extensions 747 that preferably are included in (or operatively attached to) platform 740. Further details of the preferred extensions 747 are also shown in FIGS. 10W-CC, and other drawings. Persons of ordinary skill in the art will understand that the extensions 747 preferably are positioned in one or more corresponding slots 738 (see FIG. 10W) formed in cylinder 732, and preferably slidably move within those slot/s 738 in response to a user's actuation of the dial 730. Preferably, that movement (of the extensions 747) is toward/away from the grinding element/s, in unison with platform 740 to which the extensions 747 are operatively connected. The extensions 747 can be of a wide range of shapes and sizes, and can be fabricated in a wide variety of manners. As illustrated in FIGS. 10A-E, extensions 747 preferably are integrally formed with both the platform 740, tab 745, and detent 746 (although, among many other embodiments, extensions 747 could be formed separately and glued or otherwise attached to the corresponding tab 745 and/or the edge of platform 740, could be unconnected to detent/s 746, etc.). Among other things, each such extension 747 preferably conforms generally to the width of a corresponding slot 738, and extends at least slightly above the surface of platform 740 that faces the grinding element/s when assembled. Among other things, these extensions 747 help keep pieces of the material/s being ground from falling into the corresponding slot/s 738, and instead keeps those materials desirably positioned over the upper surface of the platform 740 (so that the material/s can be ground and used). The keyed/sliding engagement of the extension/s 747 within the slot/s 738 also helps reduce the risk that the rotation action of the assembly will become jammed (due to those materials being trapped within the slot/s 738, for example). Although detents 846 (FIGS. 10F-I) also travel in the slot/s 738 in a similar manner (even without the extension/s 747), the addition of an extension 747 can also further ensure the desired alignment and movement of the various elements of the assembly during use such as moving the platform 740/840 toward or away from the grinding element/s. The curved edges of the extension/s 747 preferably conform to a mating shape in the slot/s 238, so that those edges/surfaces contact each other when the platform 740 is at its closest position to the grinding element/s. In that regard, those upper edge/s of the extension/s 747 can function as "stops" against further movement of the platform 740 toward the grinding element/s.

f. FIGS. 10J-Q illustrate one of the many alternative embodiments of a dial element/assembly that can be used in an assembly such as shown in FIGS. 10A-E. Although this embodiment shows the dial element/assembly fabricated as two parts that are assembled to each other, persons of ordinary skill in the art will understand that other embodiments can include a single integral piece (fabricated by injection molding, 3D printing, machining, or other suitable method/s) or more than two pieces assembled together. As mentioned above, the inner cylinder 732 in FIGS. 10J-M is used instead of the central post in embodiments such as FIGS. 1A-F (although other embodiments might include both a cylinder 732 and central post). The dial/disk 730 (in FIGS. 10N-Q) is similar in many ways to the dial element 30 shown in FIGS. 1A-F. Preferably, cylinder 732 is operatively attached to the dial 730 by any one or more suitable methods, including friction fit, interference fit, gluing, welding, sonic welding, or the like. Preferably, a mechanical engagement of those parts 732 and 730 is provided by one or more corresponding detents 739A-D (persons of ordinary skill in the art will understand that detents 739A and B correspondingly interfit when assembled, as do detents 739C and D. Among other things, the radial position of detents 739A and B (with respect to a central axis A) is illustrated as spaced inwardly (slightly closer to axis A) than the diameter of the cylinder 732. Persons of ordinary skill in the art will understand that this spacing is one of a wide range of embodiments by which the inventions may be practiced. Among other things, those detents 739A and B may be even closer to the central axis A than shown, or may be directly below the wall of cylinder 732 (and thereby have the same radial distance from the central axis A as does that cylinder wall). Regardless of the structure or method used to join element 730 and 732, preferably the joint is sufficiently strong to withstand expected repeated twisting and/or other forces that will be exerted upon that joint during use of the assembly, including as the user moves the platform 740 to a selected location within the cylinder 732.

g. FIGS. 10R-V illustrate further details of the first container body 720 as may be used in the embodiment of FIGS. 10A-E. Preferably, many aspects of the body 720 are similar to body 20 in FIGS. 1A-E, including preferably a threaded engagement of the upper portion to a corresponding grinding assembly (not shown), and preferably a snap-fit ring to permit a user to rotate the dial element 730 with respect to the first container body 720, about a central axis A. Persons of ordinary skill in the art will understand that, instead of the arrangement illustrated in the embodiment of FIGS. 1A-E (snap fit ring 39 and detent engagement groove 29 acting between those two parts 20 and 30), an effective "ring" is formed on container 720 as one or more spaced/radially aligned detents 729 (which together are "portions" of a single ring). Those detent/s 729 preferably engage a groove 739 formed on the inner cylinder 732, by snap-fit engagement, and have a slidable fit resulting in a rotatable engagement between parts 732 and 720 about a central axis A. In addition, rather than threaded engagement between a central post and an urging platform (as shown in FIGS. 1A-E), first container 720 preferably includes at least one helical/threaded path 725 configured and sized and positioned to engage a corresponding detent 746, and permit that detent to slide within that path 725 when the user rotates the container 720 with respect to the dial 730.

Among the many other alternative embodiments of the inventions, the urging/compression plate can be urged toward the grinder region by any of a wide range of suitable apparatus and methods. For example, one or more springs (not shown) having a suitable compression/spring force can be placed between the compression plate and an underlying surface. In a simple embodiment of such an approach, a single spring element can be positioned around the central post (such as post 32 in FIGS. 1A-E) with one end of the spring on the compression plate actuator (dial element) and the other end of the spring against the surface of the platform nearest the dial. The threads engaging that post with the compression plate can be left in place (so the spring would supplement the "urging" force exerted on the platform by turning the dial), or alternatively those threads can removed or omitted. The herbs or other material to be ground can be placed on the compression plate, and the spring compressed as the rest of the assembly is assembled. The natural memory/expansion action of the spring/s can then urge the compression plate and the materials thereon toward the grinding region.

FIGS. 11A-C illustrate examples of prior art containers (for storing and/or transporting herbs and similar materials) that can be used with the present inventions.

FIG. 12A is a screenshot taken near the beginning of a YouTube video, illustrating a selection of apparently prior art coffee grinders available to consumers. The website is https://www.youtube.com/watch?v=PXU2NXT1mlg, and information on that website indicates that the video was published on Nov. 22, 2019 It appears that all of the grinders in that video apparently use gravity feed of the coffee beans down into and through the grinding burr elements, and at least some of the grinders disclose receiving the ground coffee beans in a container at the bottom of the respective device.

FIGS. 12B-D are screenshots that illustrate further details of a coffee grinder of the type shown in FIG. 12A, captured from the following websites: FIG. 12B: https://cdn.shopify.com/s/files/1/1553/0487/files/hiku-manual-V1.2.pdf?316; FIG. 12C: https://kansocoffee.com/products/hiku-hand-coffee-grinder; and FIG. 12D: https://www.youtube.com/watch?v=EnMrjkO9Fdc.

In order to describe and summarize the present inventions, certain objects and advantages have been described herein. In any particular embodiment of the inventions, not necessarily all such objects or advantages may be achieved. Thus, for example, those skilled in the art will recognize that the invention may be embodied or carried out in a manner that achieves or optimizes one advantage or group of advantages as disclosed herein, without necessarily achieving other objects or advantages as may be disclosed or suggested herein.

The apparatus and methods of the inventions have been described with some particularity, but the specific designs, constructions, and steps disclosed are not to be taken as delimiting of the inventions. A wide range of modifications and alternative structures and steps for practicing the inventions will make themselves apparent to those of ordinary skill in the art, all of which will not depart from the essence of the inventions, and all such changes and modifications are intended to be encompassed within the appended claims.

What is claimed is:

1. An apparatus for storing, transporting, grinding, and/or pouring herbs and/or similar materials and/or things, including:
    a first storage element having a first opening;
    a grinding assembly removably engaged as a cover on said first opening in said first storage element, said grinding assembly comprising a plurality of rotatable grinding elements configured to rotate with respect to each other and accomplish grinding of herbs and/or similar materials and/or things, said grinding assembly removable to permit herbs and/or similar materials and/or things to be placed into said first storage element, said grinding assembly configured to receive herbs and/or similar materials and/or things from said first storage element and pass the herbs and/or similar materials and/or things between said rotatable grinding elements during rotation of said grinding elements with respect to each other to grind the herbs and/or similar materials and/or things;
    a second storage element formed in said grinding assembly and configured and to receive the herbs and/or similar materials and/or things once they pass through said grinding assembly after grinding; and
    an urging platform moveable within said first storage element in directions toward and/or away from said grinding assembly, said urging platform configured to, independently of said grinding process, urge the herbs and/or similar materials and/or things into grinding engagement with said grinding assembly and to force the herbs and/or similar materials and/or things against said grinding assembly so that a selectable amount of the herbs and/or similar materials and/or things in said first storage element are passed through said grinding assembly into said second storage element.

2. The apparatus of claim 1, further including a rotatable dial element, said dial element rotatably engaged with and covering a second opening in said first storage element, said dial element engaged with said urging platform to cause said movement of said platform within said first storage element upon rotation of said dial element with respect to said first storage element.

3. The apparatus of claim 1, in which said second storage element includes a removable cap covering a second opening in said second storage element to permit selective removal from the apparatus of the herbs and/or similar materials and/or things after grinding.

4. The apparatus of claim 1, in which said second storage element is configured to permit removal from the apparatus of the herbs and/or similar materials and/or things after grinding.

5. A method of storing, transporting, grinding, and/or pouring herbs and/or similar materials and things, including the steps of:

providing an apparatus of claim 1, having within its first storage element one or more items to be ground;

using said urging platform within said first storage element to urge the herbs and/or similar materials and/or things toward said grinding assembly;

actuating said grinding assembly whereby the herbs and/or similar materials and/or things are ground; and dispensing the ground herbs and/or similar materials and/or things from said apparatus.

6. The method of claim 5, further including the steps of:

removing said grinding assembly from said first opening of said first storage element; and inserting herbs and/or similar materials and/or things into said first storage element.

7. The method of claim 5, further including the steps of:

removing a dispensing cap from said second storage element;

pouring the ground herbs and/or similar materials and/or things from said apparatus; and reattaching said dispensing cap to said apparatus.

8. The apparatus of claim 1, in which said grinding assembly includes an inner burr and an outer burr that are sized, shaped, and configured to rotate with respect to each other and accomplish the grinding of the herbs and/or similar materials and/or things;

said outer burr having an opening therethrough to facilitate passage of the herbs and/or similar materials and/or things from said first storage element to said second storage element; and said inner burr including a burr element having dimensions larger than said opening in said outer burr.

9. The apparatus of claim 8, said inner burr of said grinding assembly being positioned relatively closer to said first storage element and said outer burr being relatively further from said first storage element, said grinding assembly further including a grinder actuator larger than said opening in said outer burr, said grinder actuator attached to said inner burr so that said outer burr is between said inner burr and said grinder actuator and said inner burr and said outer burr can be rotated with respect to each other by gripping and rotating said grinder actuator with respect to said first storage element.

10. The apparatus of claim 1, in which said first storage element is watertight.

11. The apparatus of claim 1, in which said second storage element is watertight.

12. The apparatus of claim 1, in which movement of the herbs and/or similar materials and/or things through said grinding assembly into said second storage element is assisted by inverting the apparatus so that gravity pulls the herbs and/or similar materials and/or things into said second storage element.

13. An apparatus for storing, transporting, grinding, and/or pouring herbs and/or similar materials and/or things, including:

a first storage element having a first opening;

a grinding assembly removably covering said first opening in said first storage element, said grinding assembly removable to permit herbs and/or similar materials and/or things to be placed into said first storage element, said grinding assembly configured to receive and grind herbs and/or similar materials and/or things from said first storage element and allow the herbs and/or similar materials and/or things to pass through said grinding assembly as part of a grinding process;

a compressing/urging plate/platform moveable within said first storage element in directions toward and/or away from said grinding assembly, to urge the herbs and/or similar materials and/or things toward said grinding assembly for grinding and to be moved away from said grinding assembly to permit further herbs and/or similar materials and/or things to be placed into said first storage element;

a second storage element configured and positioned to receive the herbs and/or similar materials and/or things from said grinding assembly after grinding, in which said grinding assembly includes an inner burr and an outer burr that are sized, shaped, and configured to rotate with respect to each other and accomplish the grinding of the herbs and/or similar materials and/or things; and said outer burr having an opening therethrough to facilitate passage of the herbs and/or similar materials and/or things from said first storage element to said second storage element; and said inner burr including a burr element having dimensions larger than said opening in said outer burr.

14. The apparatus of claim 13, said inner burr of said grinding assembly being positioned relatively closer to said first storage element and said outer burr being relatively further from said first storage element, said grinding assembly further including a grinder actuator larger than said opening in said outer burr, said grinder actuator attached to said inner burr so that said outer burr is between said inner burr and said grinder actuator and said inner burr and said outer burr can be rotated with respect to each other by gripping and rotating said grinder actuator with respect to said first storage element.

\* \* \* \* \*